United States Patent
Nishimoto et al.

(10) Patent No.: US 9,069,224 B2
(45) Date of Patent: Jun. 30, 2015

(54) OPTICAL MODULATOR AND OPTICAL MODULATION CONTROL METHOD

(71) Applicant: FUJITSU OPTICAL COMPONENTS LIMITED, Kawasaki-shi, Kanagawa (JP)

(72) Inventors: Hiroshi Nishimoto, Kawasaki (JP); Hiroshi Kuwahara, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/541,897

(22) Filed: Nov. 14, 2014

(65) Prior Publication Data

US 2015/0071583 A1    Mar. 12, 2015

Related U.S. Application Data

(62) Division of application No. 13/323,022, filed on Dec. 12, 2011, now Pat. No. 8,903,239.

(30) Foreign Application Priority Data

Dec. 16, 2010 (JP) .................................. 2010-281086
Mar. 18, 2011 (JP) .................................. 2011-061692

(51) Int. Cl.
*H04J 14/02* (2006.01)
*H04B 10/04* (2006.01)
(Continued)

(52) U.S. Cl.
CPC ........ *G02F 1/2257* (2013.01); *H04B 10/50572* (2013.01); *H04B 10/50575* (2013.01); *G02F 2001/212* (2013.01); *G02F 1/0123* (2013.01)

(58) Field of Classification Search
CPC .................. H04B 10/50572; H04B 10/50575; G02F 2001/212; G02F 1/2257; G02F 1/0123

USPC ................. 398/54, 79, 182, 98, 183, 65, 184; 385/3

See application file for complete search history.

(56) References Cited

U.S. PATENT DOCUMENTS

4,350,868 A * 9/1982 Takagi et al. .............. 219/137 R
4,524,389 A * 6/1985 Isobe et al. .................. 348/725
(Continued)

FOREIGN PATENT DOCUMENTS

JP  04-140712    5/1992
JP  2005-326548  11/2005
(Continued)

OTHER PUBLICATIONS

Japanese Office Action mailed Sep. 2, 2014 in corresponding Japanese Patent Application No. 2011-061692.
(Continued)

*Primary Examiner* — Ken Vanderpuye
*Assistant Examiner* — Abbas H Alagheband
(74) *Attorney, Agent, or Firm* — Staas & Halsey LLP

(57) ABSTRACT

An optical modulator includes: a modulator including an optical waveguide provided in a semiconductor substrate having an electro-optical effect and an electrode to apply an electric field depending on a bias voltage and a modulation signal to the optical waveguide; a driver circuit to generate a modulation signal in accordance with an input signal; a superimposer to superimpose a reference signal on the bias voltage, the reference signal having lower frequency than the modulation signal; and a controller to control a bias voltage in a direction orthogonal to a modulation direction of the modulator based on the frequency component of the reference signal extracted from a modulated optical signal generated by the modulator.

2 Claims, 30 Drawing Sheets

(51) Int. Cl.
*H04J 14/08* (2006.01)
*H04B 10/02* (2006.01)
*H04J 14/06* (2006.01)
*G02F 1/295* (2006.01)
*G02F 1/225* (2006.01)
*H04B 10/50* (2013.01)
*G02F 1/01* (2006.01)
*G02F 1/21* (2006.01)

(56) References Cited

U.S. PATENT DOCUMENTS

| | | | |
|---|---|---|---|
| 5,170,274 A | 12/1992 | Kuwata et al. | |
| 5,359,449 A * | 10/1994 | Nishimoto et al. | 398/198 |
| 6,198,357 B1 * | 3/2001 | O'Toole et al. | 331/57 |
| 6,278,539 B1 * | 8/2001 | Ooi et al. | 359/237 |
| 6,639,482 B2 | 10/2003 | Geiger et al. | 332/106 |
| 7,133,610 B1 * | 11/2006 | Shimura et al. | 398/15 |
| 7,266,306 B1 * | 9/2007 | Harley et al. | 398/182 |
| 7,321,702 B2 * | 1/2008 | Akiyama et al. | 385/3 |
| 7,366,362 B2 * | 4/2008 | Tanimura | 385/1 |
| 7,657,190 B2 * | 2/2010 | Akiyama | 398/195 |
| 7,848,659 B2 * | 12/2010 | Miura et al. | 398/186 |
| 7,936,998 B2 * | 5/2011 | Akiyama | 398/195 |
| 8,184,991 B2 * | 5/2012 | Farina et al. | 398/198 |
| 8,249,531 B2 * | 8/2012 | Xu et al. | 455/127.1 |
| 8,472,810 B2 * | 6/2013 | Akiyama et al. | 398/184 |
| 8,582,981 B2 * | 11/2013 | Akiyama et al. | 398/188 |
| 8,761,548 B2 * | 6/2014 | Kuwahara | 385/2 |
| 8,761,613 B2 * | 6/2014 | Dou et al. | 398/198 |
| 8,805,526 B2 * | 8/2014 | Carpenter et al. | 607/60 |
| 2001/0007508 A1 * | 7/2001 | Ooi et al. | 359/245 |
| 2003/0202727 A1 * | 10/2003 | Olesen | 385/1 |
| 2003/0231891 A1 * | 12/2003 | Kuzukami et al. | 398/198 |
| 2005/0068600 A1 * | 3/2005 | Ogura | 359/238 |
| 2005/0105917 A1 * | 5/2005 | Narusawa et al. | 398/183 |
| 2005/0162338 A1 * | 7/2005 | Ikeda et al. | 345/2.1 |
| 2005/0249444 A1 * | 11/2005 | Imai et al. | 385/1 |
| 2006/0034616 A1 * | 2/2006 | Tipper | 398/186 |
| 2006/0263098 A1 * | 11/2006 | Akiyama et al. | 398/188 |
| 2007/0003179 A1 * | 1/2007 | Tanimura | 385/1 |
| 2007/0065161 A1 * | 3/2007 | Miura et al. | 398/186 |
| 2007/0092266 A1 * | 4/2007 | Shimizu et al. | 398/198 |
| 2007/0177882 A1 * | 8/2007 | Akiyama | 398/185 |
| 2007/0260293 A1 * | 11/2007 | Carpenter et al. | 607/60 |
| 2008/0080872 A1 * | 4/2008 | Tanaka et al. | 398/186 |
| 2008/0112710 A1 | 5/2008 | Tanaka et al. | |
| 2009/0047028 A1 * | 2/2009 | Terahara et al. | 398/188 |
| 2009/0092401 A1 * | 4/2009 | Sekine et al. | 398/185 |
| 2009/0232517 A1 * | 9/2009 | Farina et al. | 398/183 |
| 2009/0270037 A1 * | 10/2009 | Ikeda et al. | 455/41.3 |
| 2009/0279828 A1 * | 11/2009 | Nilsson et al. | 385/14 |
| 2010/0098435 A1 * | 4/2010 | Akiyama | 398/188 |
| 2010/0113105 A1 * | 5/2010 | Xu et al. | 455/572 |
| 2010/0142025 A1 * | 6/2010 | Fujisaku | 359/239 |
| 2011/0026935 A1 * | 2/2011 | Akiyama et al. | 398/184 |
| 2011/0129232 A1 * | 6/2011 | Dou et al. | 398/198 |
| 2012/0128289 A1 * | 5/2012 | Kuwahara | 385/2 |
| 2013/0045773 A1 * | 2/2013 | Xu et al. | 455/522 |

FOREIGN PATENT DOCUMENTS

| | | |
|---|---|---|
| JP | 2008-92172 | 4/2008 |
| JP | 2008-122786 | 5/2008 |
| JP | 2009-198881 | 9/2009 |

OTHER PUBLICATIONS

Office Action mailed Apr. 17, 2014 in corresponding U.S. Appl. No. 13/323,022.
Notice of Allowance mailed Jul. 31, 2014 in corresponding U.S. Appl. No. 13/323,022.
U.S. Appl. No. 13/323,022, filed Dec. 12, 2011, Nishimoto et al., Fujitsu Optical Components Limited.

* cited by examiner

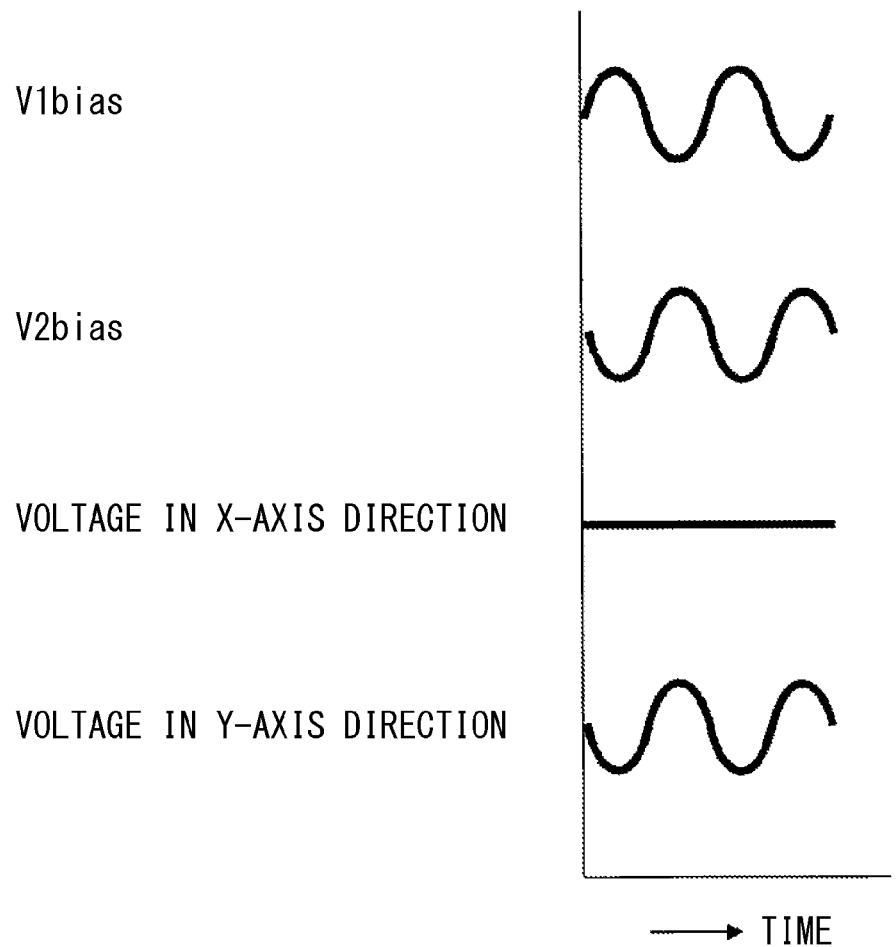
F I G. 1 0

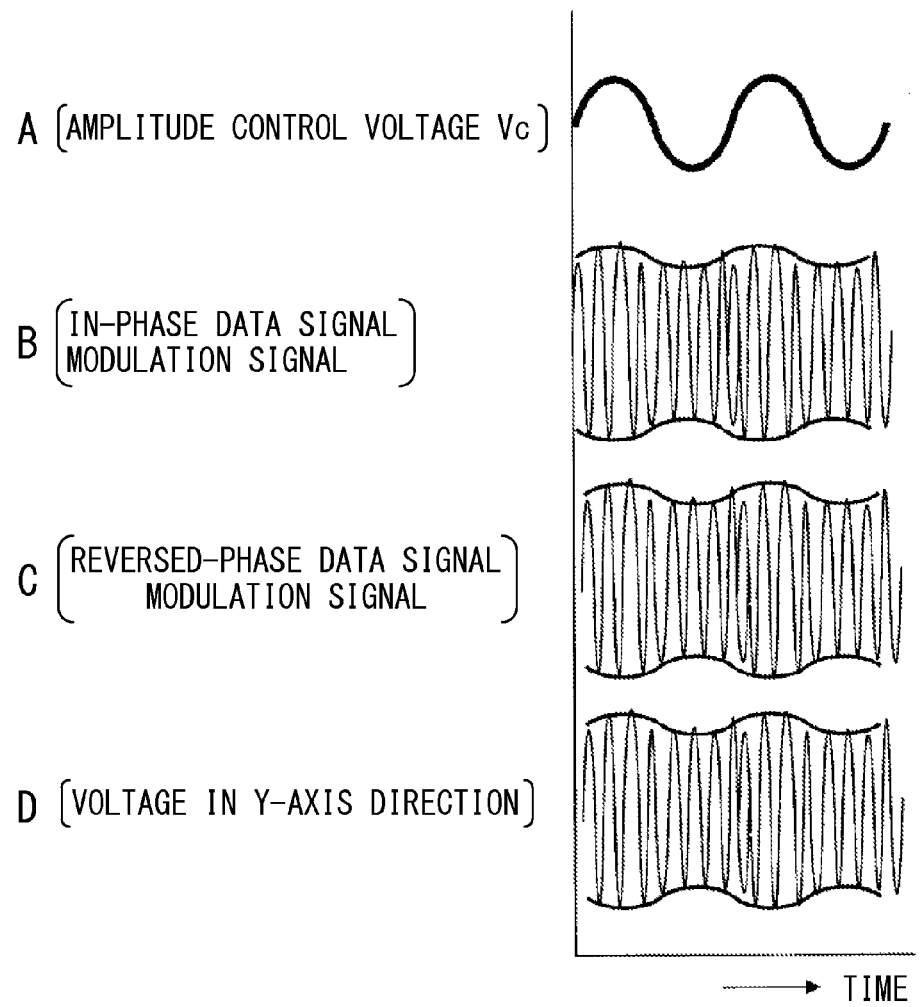
F I G. 1 4

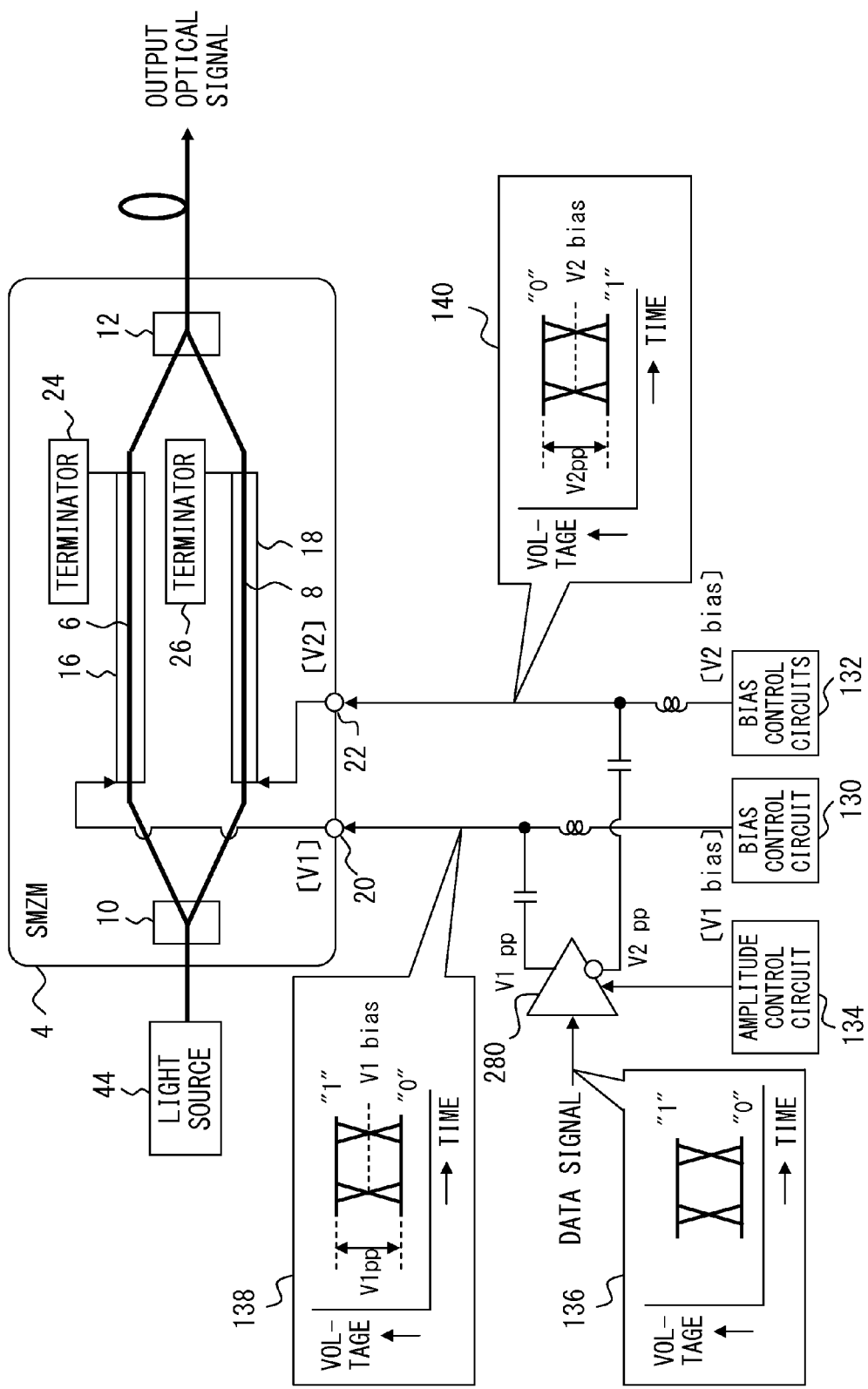
F I G. 25

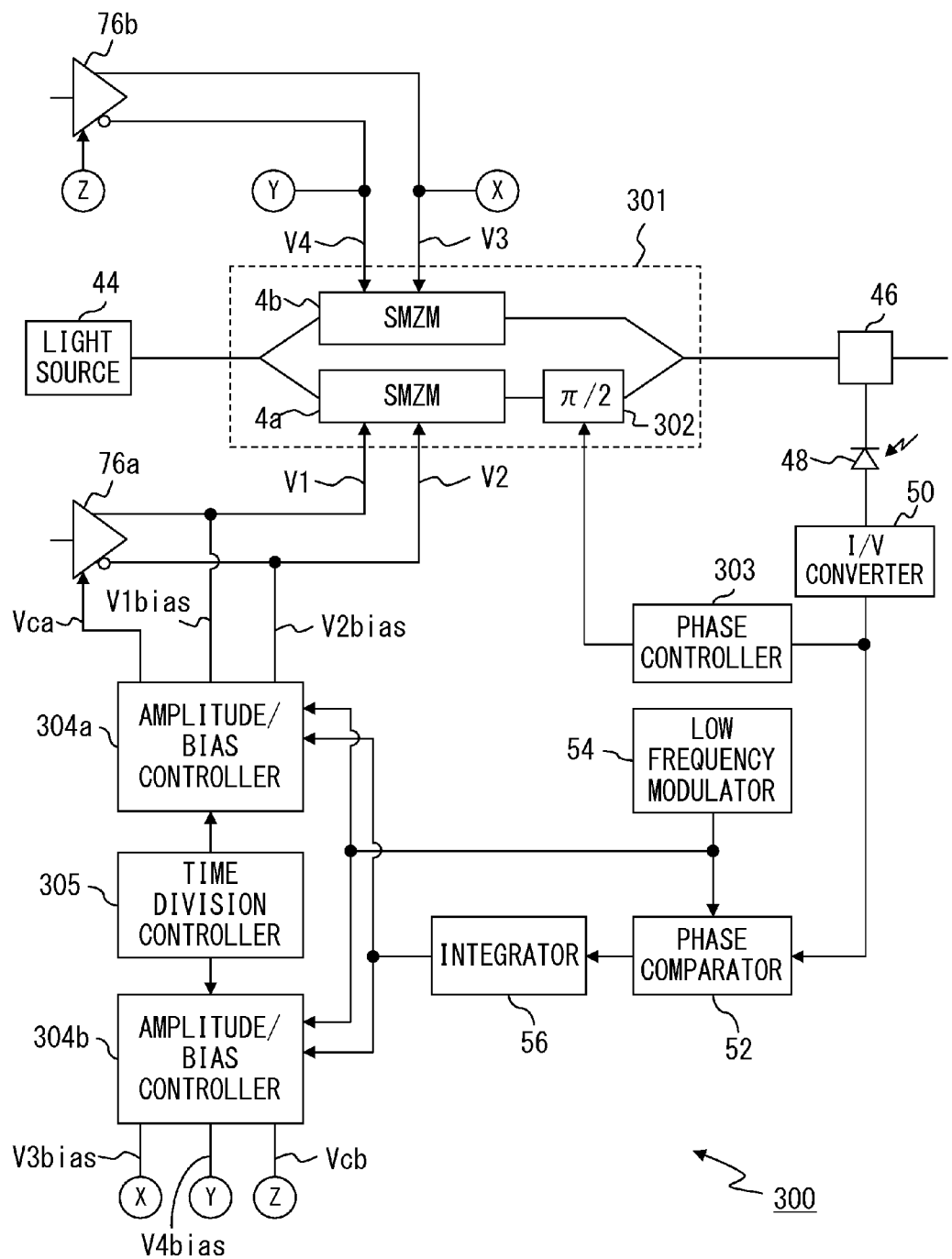
F I G. 2 6

OPTICAL MODULATOR AND OPTICAL MODULATION CONTROL METHOD

CROSS-REFERENCE TO RELATED APPLICATIONS

This application is a divisional of U.S. Ser. No. 13/323,022, filed Dec. 12, 2011, which is based upon and claims the benefit of priority of the prior Japanese Patent Application No. 2010-281086, filed on Dec. 16, 2010 and the prior Japanese Patent Application No. 2011-061692, filed on Mar. 18, 2011, the entire contents of which are incorporated herein by reference.

FIELD

The embodiments described in this application are related to an optical modulator and an optical modulation control method, and may be applied to the optical modulation using, for example, a semiconductor Mach-Zehnder modulator (SMZM).

BACKGROUND

Recently, a semiconductor Mach-Zehnder modulator (SMZM) has been commercialized as an optical modulator. The SMZM is more easily realized as a small device than an LN modulator etc., and has a broader wavelength band characteristic than an electro-absorption modulator (EA modulator).

As a related technique, an optical semiconductor device in which a semiconductor laser and a Mach-Zehnder modulator are integrated in the direction of optical waves guided on the same semiconductor substrate has been proposed (for example, Japanese Laid-open Patent Publication No. 2009-198881).

As another related technique, the following optical modulator has been proposed. That is, the optical modulator includes: optical interference means for branching input light into two optical waveguides, combining light beams which propagate the respective optical waveguides, and outputting the combined light; phase modulating voltage supplying means for supplying a voltage for modulating of the phase of propagated light to at least one optical waveguide in the two optical waveguides; direct current voltage supplying means for supplying a direct current voltage to at least one optical waveguide in the two optical waveguides; and direct current control means for controlling the value of the direct current voltage supplied by the direct current voltage supplying means depending on the wavelength of the input light (for example, Japanese Laid-open Patent Publication No. 2005-326548).

As a further related technique, the following optical transmitter has been proposed. That is, the optical transmitter includes: a light source, a drive circuit for generating a drive voltage depending on an input signal; an optical modulator for modulating the emitted light from the light source depending on the drive voltage, and converting the input signal into an optical signal; and an operation point stabilization circuit for detecting the drift of the operation characteristic curve of the optical modulator, and controlling the optical modulator so that the operation point is placed in a specified position with respect to the operation characteristic curve. The optical transmitter further includes an operation point shift circuit for shifting the operation point by half cycle on the operation characteristic curve according to an operation point switch signal (for example, Japanese Laid-open Patent Publication No. 04-140712).

The SMZM includes a pair of optical waveguides. The input light from the light source is branched and directed to the pair of optical waveguides. In addition, the SMZM also includes an electrode for supplying an electric field to each optical waveguide. A drive signal generated from a data signal and a bias voltage are applied to each electrode. Then the SMZM generates a modulated optical signal by modulating the input light with the drive signal. In this case, a high quality modulated optical signal is generated by appropriately adjusting the drive amplitude (that is, the amplitude of the drive signal) and the bias voltage.

However, the static characteristic of the SMZM indicates variance for each device, and depends on the wavelength of input light. Therefore, to determine in advance the optimum combination of a drive amplitude and a bias voltage for each SMZM while considering the wavelength of input light, an enormously long time is taken. In addition, although the optimum combination of a drive amplitude and a bias voltage is determined in advance for the SMZM, the static characteristic of the SMZM may be changed depending on the ambient temperature, aging, etc. If the static characteristic of the SMZM changes, the quality of a modulated optical signal is degraded. For example, there occur the fold-back of an optical waveform, the degradation of an extinction ratio, the fluctuation of a cross point, the reduction of the aperture of an optical waveform, etc.

The static characteristic of the SMZM is different from that of a common LN modulator. Therefore, although a method of adjusting the operating state of an LN modulator is introduced to the SMZM, it is hard to optimize the operating state of the SMZM.

SUMMARY

According to an aspect of the invention, an optical modulator includes: a modulator including an optical waveguide provided in a semiconductor substrate having an electro-optical effect and an electrode to apply an electric field depending on a bias voltage and a modulation signal to the optical waveguide; a driver circuit to generate a modulation signal in accordance with an input signal; a superimposer to superimpose a reference signal on the bias voltage, the reference signal having lower frequency than the modulation signal; and a controller to control a bias voltage in a direction orthogonal to a modulation direction of the modulator based on the frequency component of the reference signal extracted from a modulated optical signal generated by the modulator.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates an example of V1bias, V2bias, and voltage waveforms in the X and Y-axis directions;

FIG. 14 illustrates an example of an amplitude control voltage, an in-phase modulation signal, a reversed-phase modulation signal, and a voltage in the Y-axis direction;

FIG. 25 illustrates a configuration and operation of compared example;

FIG. 26 illustrates a configuration of the optical transmission module provided with a QPSK modulator;

DESCRIPTION OF EMBODIMENTS

First Embodiment

In the first embodiment, the bias control not only in the Y-axis direction but also in the X-axis direction is realized by feedback control (that is, automatic control). That is, the bias control is realized without acquiring in advance data etc. indicating the optimum bias voltage. The X axis and the Y axis are described later.

Figure 1:
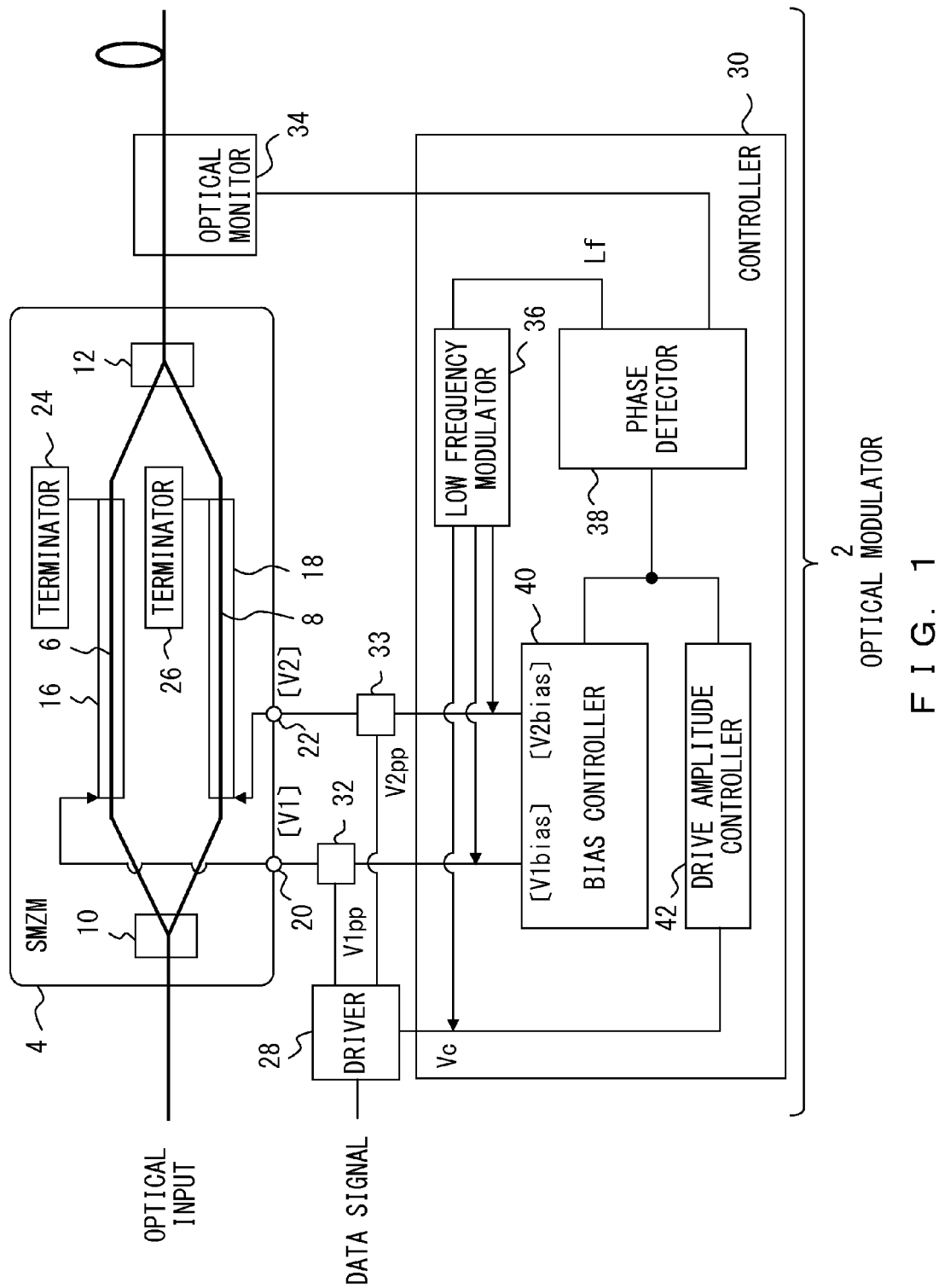
FIG. 1 illustrates an example of an optical modulator according to the first embodiment.

FIG. 1 illustrates an example of an optical modulator according to the first embodiment. An optical modulator 2 illustrated in FIG. 1 is an example of the optical modulator according to the present invention, and includes a semiconductor Mach-Zehnder modulator (hereafter referred to as an SMZM) 4 as an optical modulator. The SMZM 4 is realized by using a semiconductor substrate having an electro-optical effect. The SMZM 4 is an example of an optical modulator, and modulates the phase of transmission light according to the bias voltage and the modulation signal applied to a signal electrode.

The optical modulator according to the embodiments of the present invention is not limited to a semiconductor modulator, but includes a modulator which provides optical absorption modulation when an optical phase is modulated. FIG. 1 illustrates an example of a binary phase modulation, but the present invention is not limited to this example. That is, the optical modulator according to the embodiments of the present invention is also applied to a multilevel phase modulator (for example, a QPSK modulator). A multilevel phase modulator is realized by providing a plurality of optical modulators illustrated in FIG. 1.

The SMZM 4 includes a first optical waveguide 6 and a second optical waveguide 8. The optical waveguides 6 and 8 are formed in the above-mentioned semiconductor substrate. The optical waveguides 6 and 8 are formed, for example, parallel to each other. Input light is guided to the SMZM 4. The input light is carrier wave for transmission of a signal, and may be CW (continuous wave) light generated by, for example, a direct current light source. The light source is, for example, a laser light source. However, an optical signal output from an optical modulator may be input to the SMZM 4. The input light is branched by an optical splitter 10, and guided to the optical waveguides 6 and 8. The lightwaves which has passed the optical waveguides 6 and 8 are combined by an optical combiner 12. Thus, a modulated optical signal corresponding to the modulation signal such as a data signal etc. is generated.

A first signal electrode 16 is provided for the first optical waveguide 6. Also, a second signal electrode 18 is provided for the second optical waveguide 8. The optical waveguides 6 and 8 and the signal electrodes 16 and 18 are formed to realize a Mach-Zehnder interferometer in the semiconductor substrate having an electro-optical effect. The signal electrodes 16 and 18 respectively apply the optical waveguides 6 and 8 with electric fields depending on the bias voltage and the modulation signal. As a result, the phases of the light which passes through the optical waveguides 6 and 8 are modulated depending on the bias voltage and the modulation signal.

The signal electrode 16 is electrically coupled to a first input terminal 20, and the signal electrode 18 is electrically coupled to a second input terminal 22. An input voltage V1 is provided for the input terminal 20, and the second input voltage V2 is provided for the input terminal 22. Terminators 24 and 26 are electrically coupled to the signal electrodes 16 and 18, respectively.

The optical modulator 2 is provided with a driver 28 and a controller 30 as peripheral circuits for the SMZM 4. The driver 28 generates a modulation signal for driving the SMZM 4 from the input data signal. The modulation signal includes an in-phase modulation signal V1*pp* and a reversed-phase modulation signal V2*pp*. The reversed-phase modulation signal V2*pp* has a reversed phase with respect to the in-phase modulation signal V1*pp*. The controller 30 generates a first bias voltage V1bias and a second bias voltage V2bias. An input voltage V1 is obtained by adding the bias voltage V1bias to the in-phase modulation signal V1*pp*, and an input voltage V2 is obtained by adding the bias voltage V2bias to the reversed-phase modulation signal V2pp. The input voltage V1 and V2 are generated using bias T circuits 32 and 33, and applied to the signal electrodes 16 and 18 through the input terminals 20 and 22, respectively. The bias T circuits 32 and 33 are electric circuits including, for example, an inductor and a capacitor. Using the bias T circuits (32 and 33), the high frequency signals (V1pp, V2pp) are not affected by the respective direct current components (V1bias, V2bias), and the direct current components are not affected by the respective high frequency signals. The configuration and the operation of the bias T circuit are described in, for example, Japanese Laid-open Patent Publication No. 2007-109839.

When the input voltages V1 and V2 are applied to the signal electrodes 16 and 18, the refractive indices of the optical waveguides 6 and 8 are changed depending on the applied voltages by an electro-optical effect. The changes of the refractive indices modulate the phases of the transmission light through the optical waveguides 6 and 8. That is, the refractive index of the first optical waveguide 6 changes depending on the input voltage V1, and the refractive index of the optical waveguide 8 changes depending on the input voltage V2. As a result, in each optical waveguide, an optical phase is modulated. For example, in the optical waveguide 6, 0/–π modulation is performed on the input light, and in the optical waveguide 8, 0/π modulation is performed on the input light. In the phase modulation, push-pull drive (differential drive) may be performed to suppress optical frequency chirp. As a result, a low chirp modulated optical signal is generated, and output from the SMZM 4.

The driver 28 generates a modulation signal (in-phase modulation signal V1pp and reversed-phase modulation signal V2pp) for driving the SMZM 4. The driver 28 adjusts the amplitude of the modulation signal according to an amplitude control signal Vc provided from the controller 30. When the low frequency signal Lf is superimposed on the amplitude control signal Vc, the amplitude of the modulation signal fluctuates depending on the frequency of the low frequency signal Lf. In the description below, the state of the amplitude of the modulation signal fluctuating depending on the frequency of the low frequency signal Lf may be referred to as an "amplitude-modulation (by the low frequency signal Lf)". The amplitude of the modulation signal is referred to as a "drive amplitude (or modulation amplitude)". The low frequency signal Lf is an example of a reference signal, and for example, a low frequency small signal (dithering signal) having a small amplitude of about 1 kHz.

The controller 30 controls the SMZM 4 and the driver 28. The controller 30 controls the bias voltages V1bias and V2bias and the amplitude control signal Vc according to the modulated optical signal output from the SMZM 4. In this case, the optical monitor 34 monitors the optical signal output from the SMZM 4, and the controller 30 performs the control above according to the output of the optical monitor 34.

A low frequency modulator (low frequency signal generator) 36 generates a low frequency signal Lf. The low frequency modulator 36 operates as (part of) a superimposer to superimpose a reference signal on the bias voltage and the amplitude control signal Vc.

Figure 12:
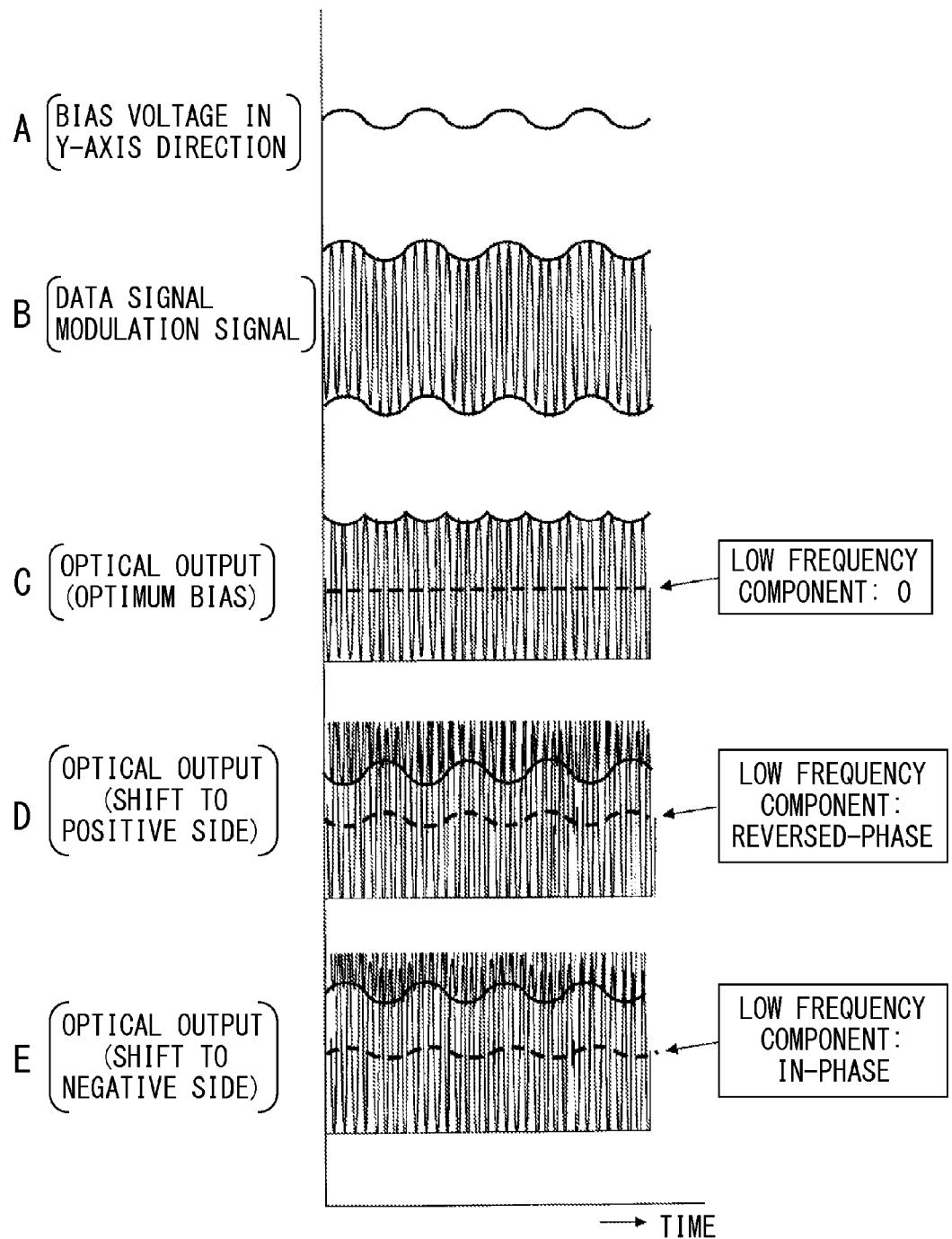
FIG. 12 illustrates an example of a bias voltage and a modulation signal in the Y-axis direction, and an optical output.
Figure 16:
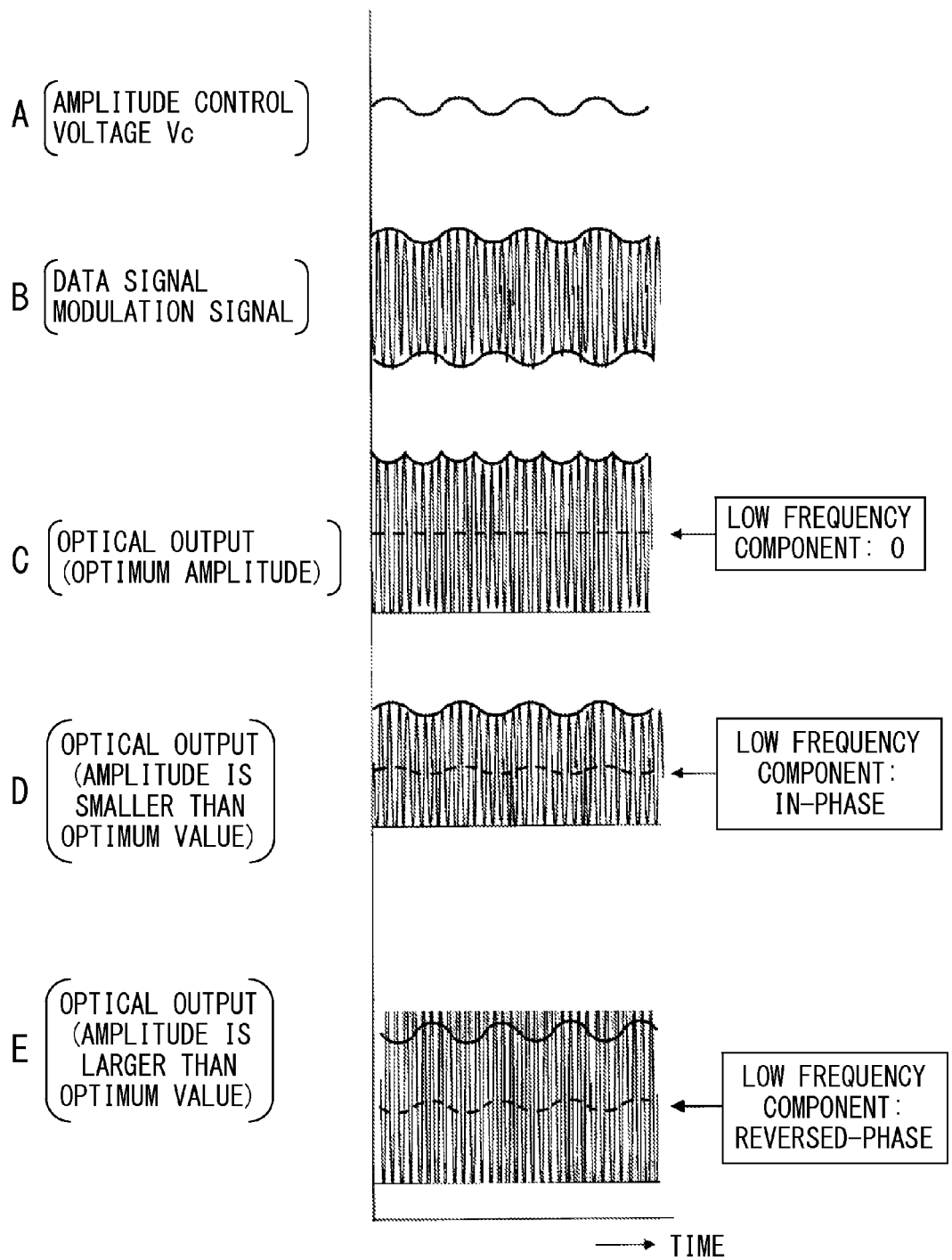
FIG. 16 illustrates an example of an amplitude control voltage, a data signal modulation signal, and an optical output.
Figure 20:
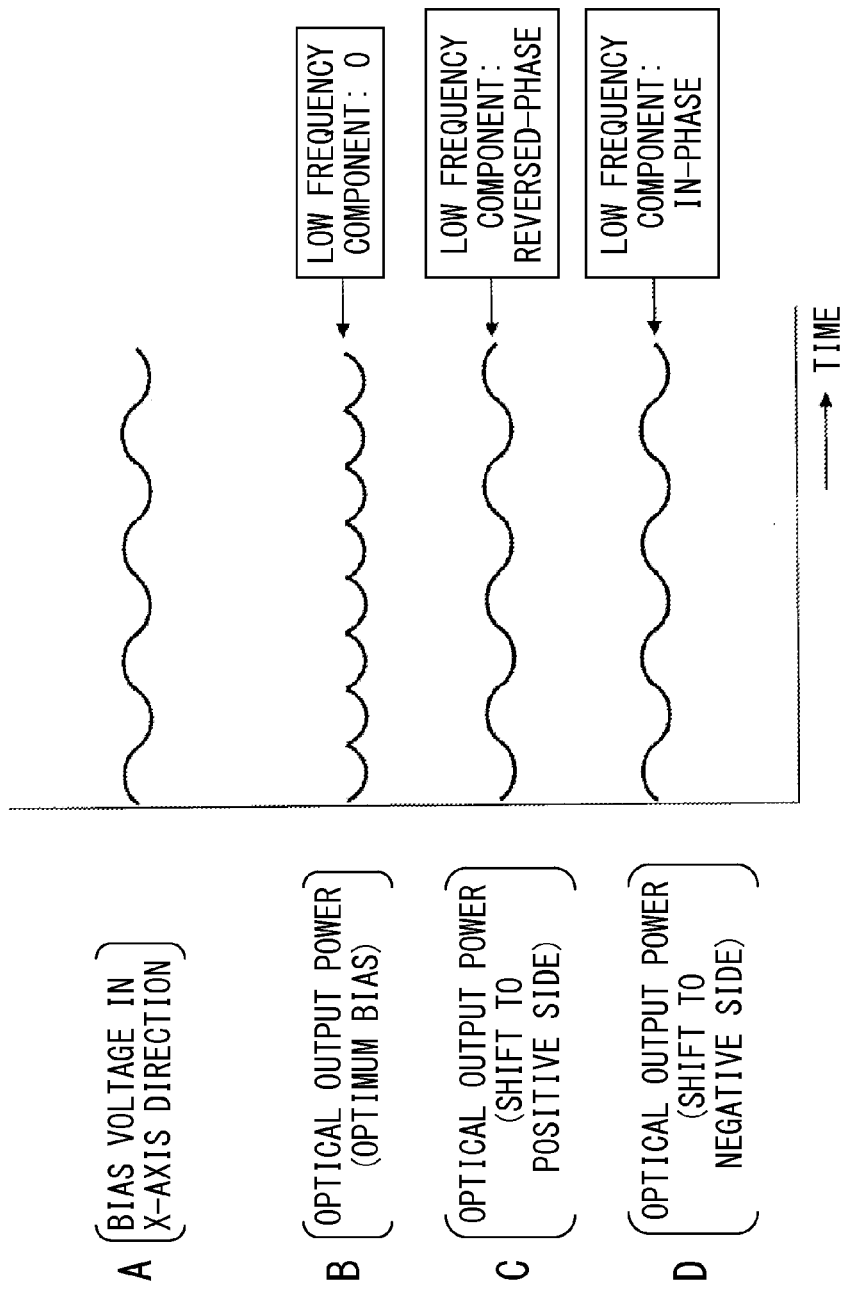
FIG. 20 illustrates an example a bias voltage in the X-axis direction and optical output power.

A phase detector 38 detects the frequency component (hereafter referred to as a low frequency component) of the low frequency signal Lf included in the modulated optical signal output from the SMZM 4. That is, the phase detector 38 operates as a low frequency detector. In this case, the phase detector 38 detects the amplitude and the phase of the low frequency component in the output optical signal using the low frequency signal Lf generated by the low frequency modulator 36. The amplitude and the phase of the low frequency component in the output optical signal depends on the operation condition (bias voltage and drive amplitude) of the SMZM 4. For example, when the operation state of the SMZM 4 is optimized, the power or the amplitude of the low frequency component included in the output optical signal is zero (FIGS. 12, 16, 20, etc.). Therefore, the controller 30 controls the bias voltage and/or drive amplitude so that the low frequency component in the output optical signal is to be smaller. By so doing, the operation state of the SMZM 4 is optimized. In addition, the phase of the low frequency component in the output optical signal is in phase (zero phase difference) or reversed (π phase difference) with respect to the low frequency signal Lf generated by the low frequency modulator 36. The phase indicates the direction (increase or decrease) of the control of the bias voltage and/or drive amplitude. Note that it may be alright to say that the controller 30 controls the bias voltage and/or drive amplitude based on the phase difference (0 or π) between the low frequency component and the low frequency signal Lf.

The bias controller 40 controls the bias voltages V1bias and V2bias. In this case, the bias controller 40 controls the bias voltages V1bias and V2bias so that the low frequency component in the output optical signal is reduced based on the output of the phase detector 38. The low frequency signal Lf is superimposed on the bias voltages V1bias and V2bias as necessary. The bias voltages V1bias and V2bias are controlled based on the power (and phase) of the low frequency component in the output optical signal. In this case, the bias controller 40 controls the bias voltage in the X-axis direction and/or Y-axis direction. That is, the bias controller 40 generates a set of bias voltages V1bias and V2bias so that the bias voltage in the X-axis direction and/or Y-axis direction are optimized or substantially optimized based on the low frequency component detected by the phase detector 38.

A drive amplitude controller 42 generates an amplitude control signal Vc for controlling the amplitude of the modulation signal generated by the driver 28. The drive amplitude controller 42 generates the amplitude control signal Vc so that the low frequency component in the output optical signal is reduced based on the output of the phase detector 38. The low frequency signal Lf is superimposed on the amplitude control signal Vc as necessary. In this case, the voltage superimposed with the low frequency signal Lf is applied for the driver 28. That is, the modulation amplitudes of the in-phase modulation signal V1pp and the reversed-phase modulation signal V2pp are controlled based on the power (and phase) of the low frequency component in the output optical signal.

Thus, the controller 30 automatically controls the bias voltage in the X-axis direction and the Y-axis direction and drive amplitude by controlling a pair of bias voltages V1bias and V2bias and the amplitude control signal Vc based on the low frequency component in the output optical signal of the SMZM 4. Therefore, the operation state of the SMZM 4 is optimized or substantially optimized without individually adjusting in advance the bias voltage and drive amplitude of the SMZM 4.

With the control, the bias voltage and drive amplitude are automatically adjusted for a constantly optimum or nearly optimum state even with the fluctuation of the characteristics of the SMZM 4 caused by a temperature change, a change by aging, etc. or the variance etc. of an LSI or a circuit device including the driver 28, the controller 30, the optical monitor 34, etc.

Figure 2:
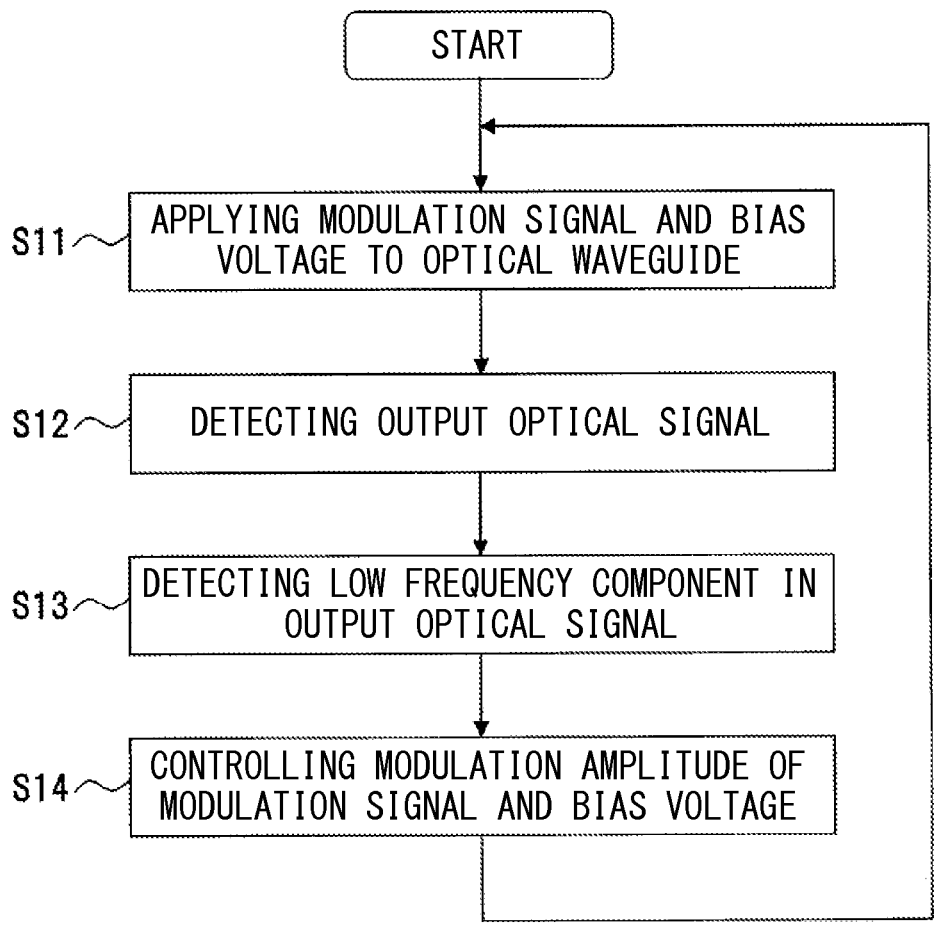
FIG. 2 illustrates an example of an optical modulation control method.

Next, refer to FIG. 2 for the procedure of the modulation control. FIG. 2 illustrates an example of an optical modulation control method. The procedure illustrated in FIG. 2 is an example of the method of optical modulation control according to the present application.

In the procedure in FIG. 2, a modulation signal and a bias voltage are applied to the optical waveguides 6 and 8. Thus, the input light of the optical waveguides 6 and 8 is modulated. (S11)

The optical monitor 34 detects the output optical signal of the SMZM 4. The monitor result is sent to the controller 30. (S12)

The controller 30 detects the low frequency component of the output optical signal. In this case, the controller 30 detects at least the power of the low frequency component. The controller 30 may detect the power and phase of the low frequency component. (S13)

Based on the detected low frequency component, the controller 30 controls the amplitude of the modulation signal and the bias voltage. (S14)

Thus, the optical waveguides 6 and 8 are provided with the modulation signal and the bias voltage controlled above. The processes in S11-S14 are repeatedly performed. Therefore, the SMZM 4 can continuously perform the optical modulation (phase modulation) in the optimum or nearly optimum operation state. That is, even when various fluctuation factors such as a temperature change, a change by aging, a variance of device, etc. exist, the optical modulator according to the present embodiment provides a stable modulation operation, and generates a high quality optical signal.

In the embodiment above, the low frequency component is detected by the phase detector 38, but the present invention is not limited to this configuration. That is, since the output optical signal of the SMZM 4 includes the information about the operation state of the SMZM 4, the present invention may extract the information about the operation state of the SMZM 4 in another method. For example, the present invention may monitor the low frequency component in the output optical signal of the SMZM 4 or its harmonic components and control the SMZM 4 depending on the monitor result by synchronous detection of the low frequency component using the low frequency signal Lf.

In the embodiment described above, both of the modulation signal and bias voltage provided for the signal electrodes 16 and 18 are controlled, but the present invention may be configured to control one of the drive amplitude and the bias voltage.

With the automatic control as described above, the bias voltage and drive amplitude can be optimized or nearly optimized, thereby obtaining the optical modulation output without the influence of a change by aging etc. As a result, the optical modulation output can be stabilized.

Figure 3:
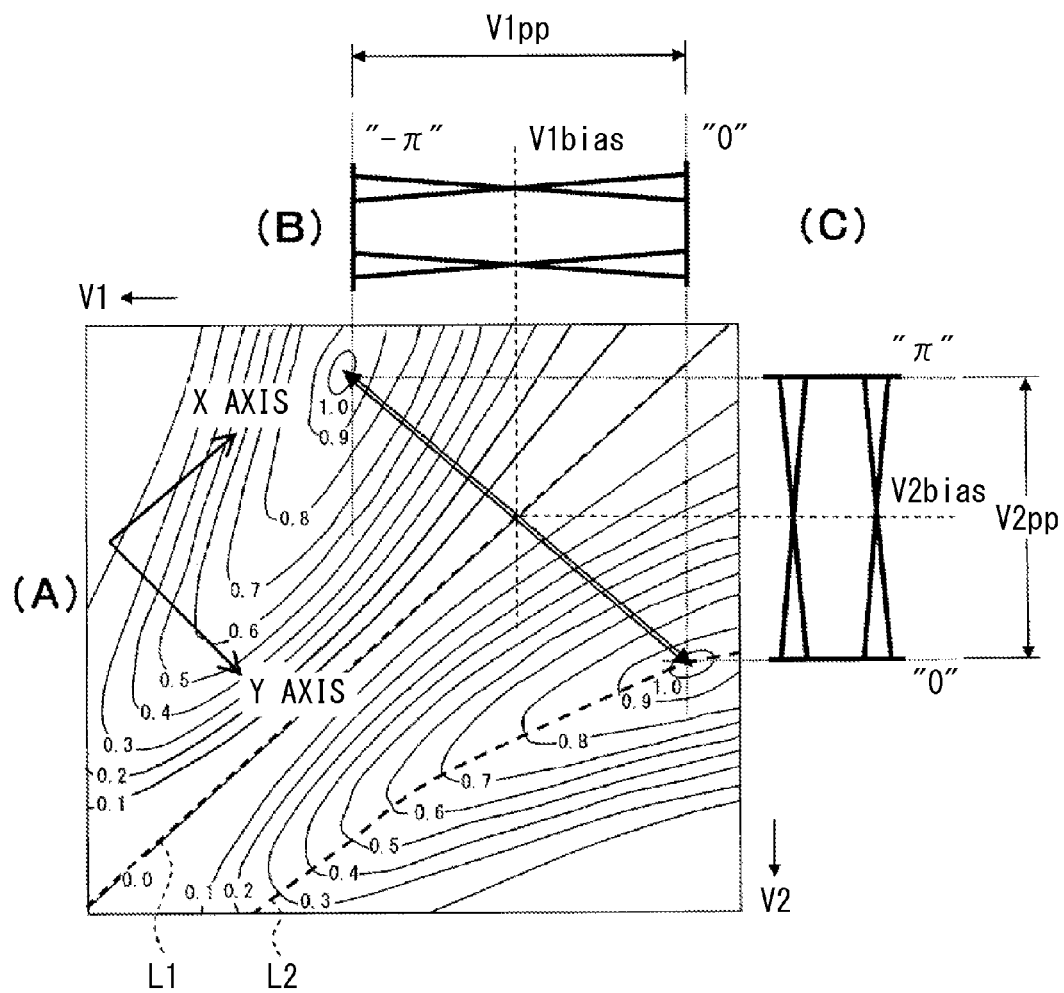
FIG. 3 illustrates an example of a static characteristic and a driving method of an SMZM.

Next, refer to FIG. 3 for the static characteristic and the optimum drive of the SMZM. FIG. 3 illustrates an example of the static characteristic of the SMZM, and an example of the optimum driving method of the SMZM. (A) of FIG. 3 illustrates the static characteristic (level line expression) of the SMZM. (B) and (C) of FIG. 3 are eye-diagrams of the waveforms of the input voltage V1 and the input voltage V2, respectively.

FIG. 3 is a 3-dimensional graph of the operation characteristic of the SMZM 4. The horizontal axis indicates the input voltage V1 applied to the signal electrode 16 of the optical waveguide 6. The vertical axis indicates the input voltage V2 applied to the signal electrode 18 of the optical waveguide 8. The output optical power of the SMZM 4 is expressed using the level line in the direction vertical to the surface of the sheet of FIG. 3. The level line expression is normalized. That is, the maximum optical power of the SMZM 4 is expressed by "1.0", and the minimum optical power (or extinguished state) of the SMZM 4 is expressed by "0.0".

To maximize the modulation level of the optical signal in the optical phase modulation, the modulation is performed so that the drive state obtained by a pair of input voltages V1 and V2 moves between two peak points (that is, the points where the optical power is "1.0") as illustrated in (A) of FIG. 3. To obtain the modulation operation, the amplitude voltage Vpp (that is, amplitude voltage Vpp of the in-phase modulation signal V1$pp$ and the reversed-phase modulation signal V2$pp$) and the bias voltages V1bias and V2bias of the modulation signal applied to the optical waveguides 6 and 8 are to be controlled so that the operation state is optimized. For example, the amplitudes of the modulation signals V1$pp$ and V2$pp$ and the bias voltages V1bias and V2bias are controlled so that the data signal "1" is set at one peak point (optical power=1.0), and the data signal "0" is set at another peak point (optical power=1.0). The modulation signal V1$pp$ indicates, for example, "zero" or "$\pi$", and the modulation signal V2$pp$ indicates, for example, "zero" or "$-\pi$".

In this specification, the direction parallel to the virtual straight line connecting the two peak points of the static characteristics illustrated in (A) of FIG. 3 is referred to as a "Y axis" or a "Y-axis direction". In the static characteristic indicated in (A) of FIG. 3, the direction parallel to the line indicating the optical power of zero is referred to an "X axis" or an "X-axis direction". In the SMZM, the X axis and the Y axis are orthogonal or approximately orthogonal to each other. In (A) of FIG. 3, the broken lines L1 and L2 indicate the levels at which "fold-back" occurs in the waveform of the output optical signal of the SMZM.

The operation state of the SMZM 4 is controlled so that applied voltage moves between the two peak points illustrated in (A) of FIG. 3. That is, the operation state obtained by the voltage corresponding to the modulation signal moves between the two peak points illustrated in (A) of FIG. 3. Therefore, in the specification, the direction parallel to the straight line connecting two peak points is referred to as a "modulation direction". That is, the modulation direction is the Y-axis direction, and the X-axis direction is orthogonal to the modulation direction.

Figure 4:
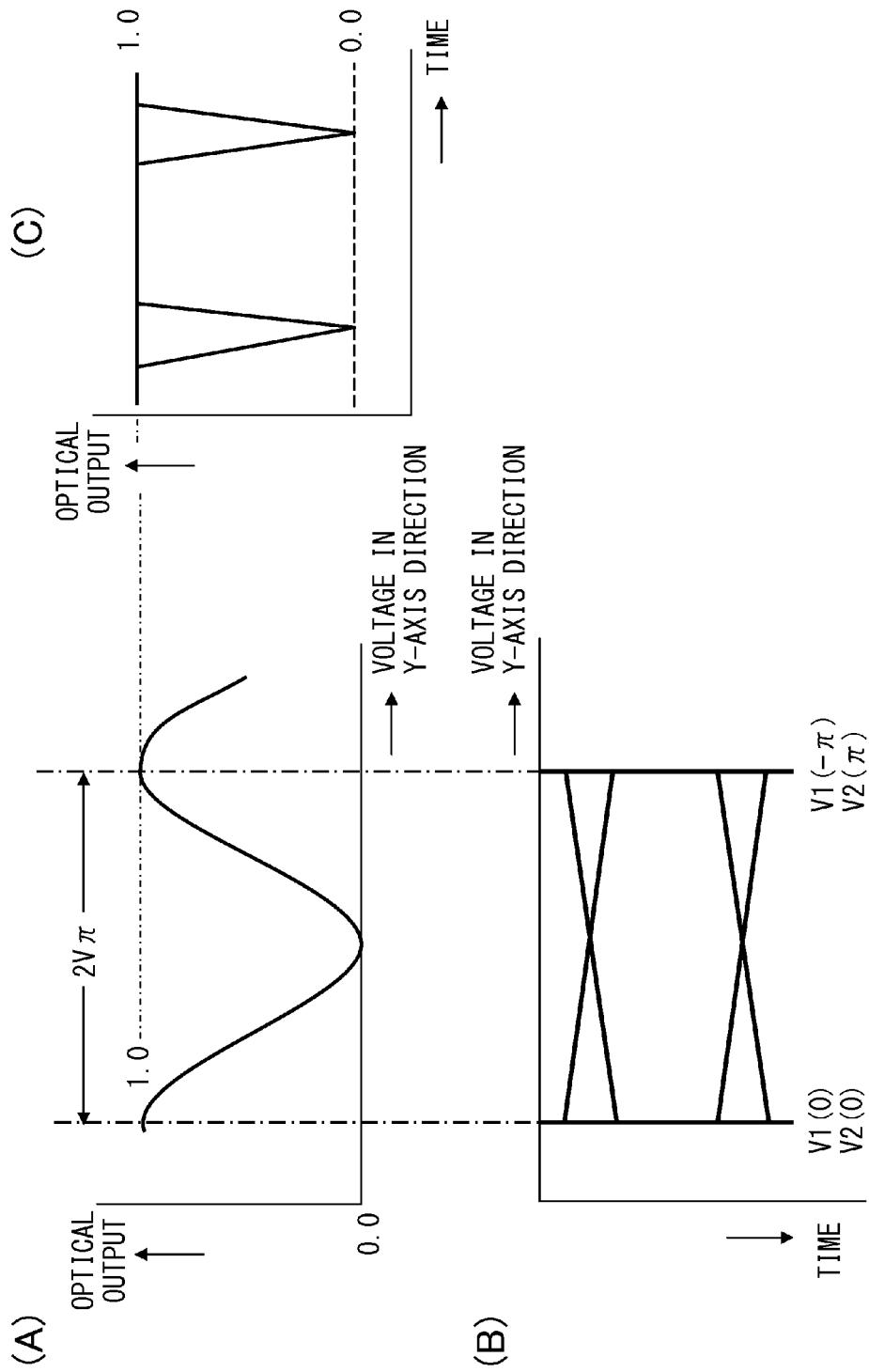
FIG. 4 illustrates an example of a modulating operation in the Y-axis direction.

Next, refer to FIG. 4 for explanation of the optical modulation in the Y-axis direction. FIG. 4 illustrates an example of a modulating operation in the Y-axis direction. (A) of FIG. 4 indicates the optical output characteristic in the Y-axis direction (that is, the modulation direction). (B) of FIG. 4 illustrates the waveform (eye diagram) of a modulation signal. (C) of FIG. 4 illustrates the waveform (eye diagram) of an output optical signal.

In the optical phase modulation, the drive amplitude in the Y-axis direction is $2V\pi$ as illustrated in (A) and (B) of FIG. 4. That is, the modulation signal "0" indicates the voltage corresponding to one of the two peak points of the output optical power of the SMZM 4. The modulation signal "1($\pi$ or $-\pi$)" indicates the voltage corresponding to the other peak point of the output optical power of the SMZM 4. The power of the output optical signal of the SMZM 4 is 1.0 as illustrated in (C) of FIG. 4. The power of the output optical signal of the SMZM 4 becomes temporarily zero when the value of the modulation signal changes.

Figure 5:
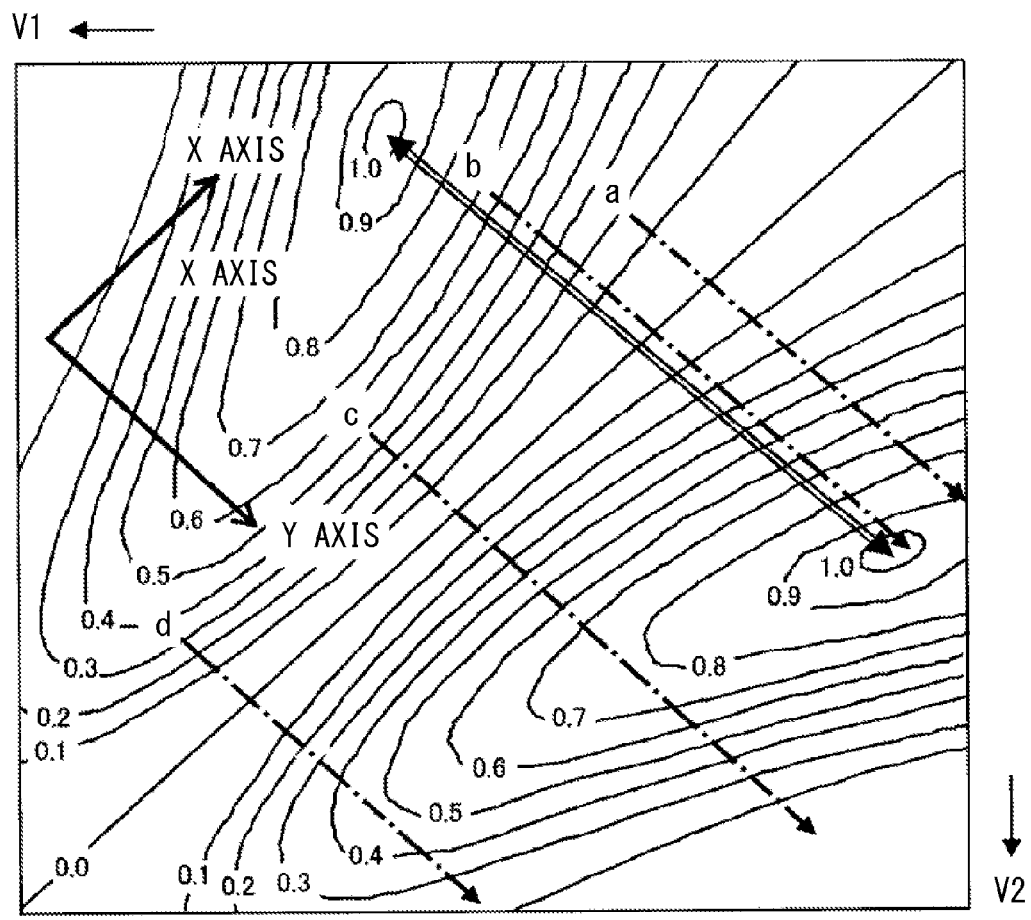
FIG. 5 illustrates an example of a static characteristic of an SMZM.
Figure 6:
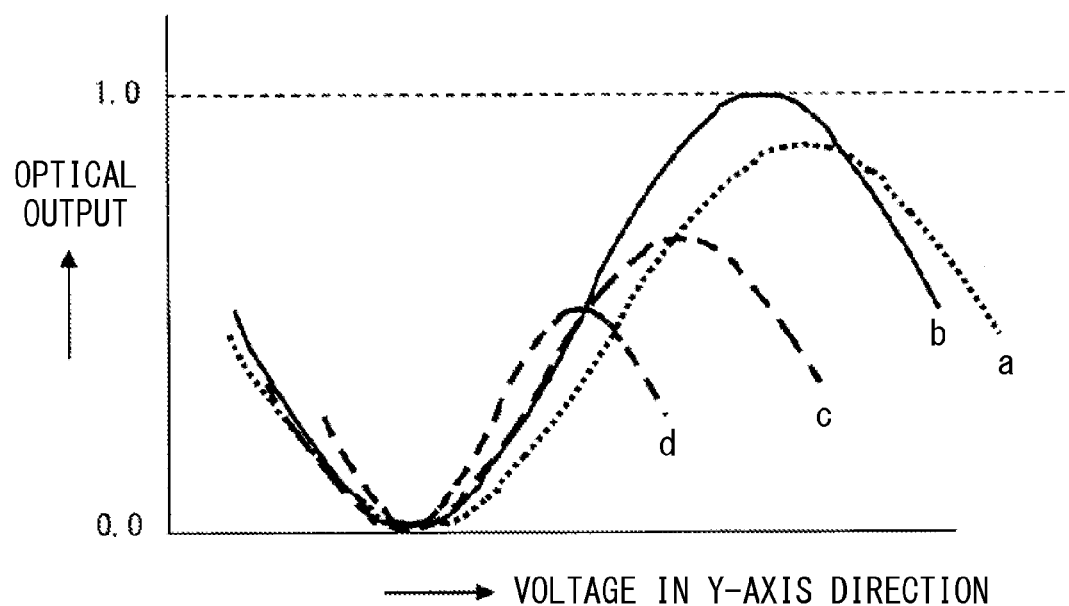
FIG. 6 illustrates an optical output with respect to voltage in the Y-axis direction.
Figure 7:
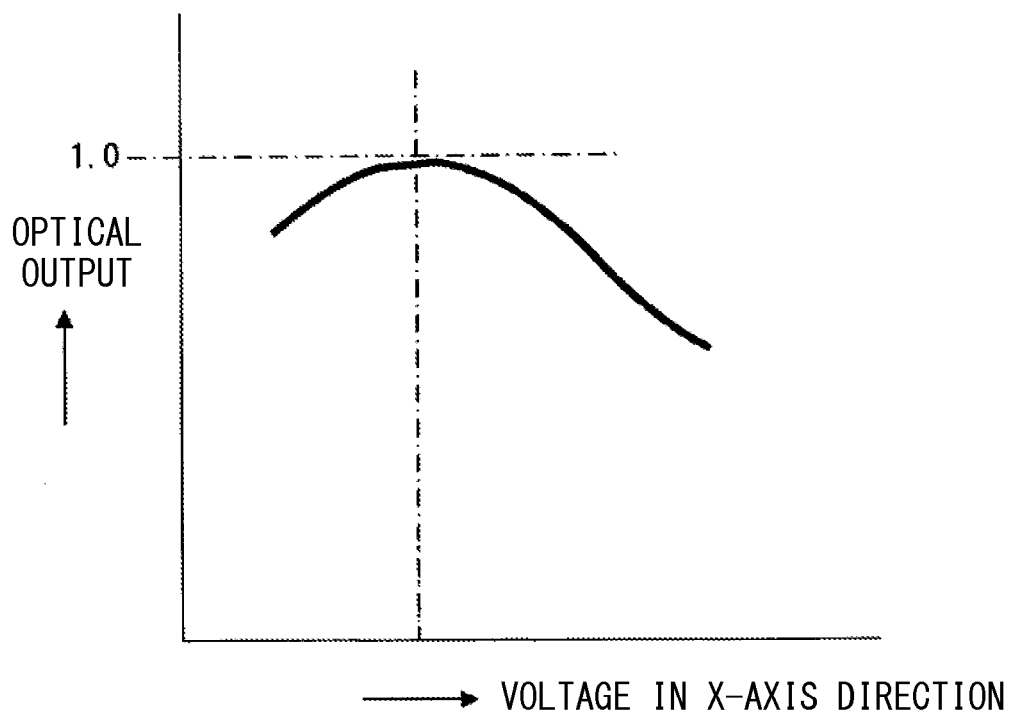
FIG. 7 illustrates an optical output with respect to voltage in the X-axis direction.

Next, refer to FIGS. 5 and 6 for the optical output characteristic in the Y-axis direction. As with FIG. 3, FIG. 5 is a 3-dimensional graph of the optical output characteristic. FIG. 6 indicates the optical output characteristic corresponding to the voltage change in the Y-axis direction. FIG. 7 illustrates an example of the optical output power characteristic in the X-axis direction.

When the bias voltage of the SMZM 4 changes, the optical output characteristic of the SMZM 4 changes correspondingly. For example, in the optical output characteristic illustrated in FIG. 5, it is assumed that four operation states a, b, c, and d of different bias voltages are applied to the SMZM 4. The state b corresponds to the optimum state. In this case, as illustrated in FIG. 6, the optical output characteristics a, b, c, and d are obtained. Each of the optical characteristics a, b, c, and d in FIG. 6 respectively correspond to the operation states a, b, c, and d in FIG. 5.

When the bias voltage is adjusted in the optimum state b, the output optical power is 1.0. In this case, as illustrated by the characteristic b in FIG. 6, high optical output is obtained. When the bias voltage is shifted from the optimum value in the X-axis direction, the output optical power of the SMZM 4 is reduced. For example, since the state a illustrated in FIG. 5 is located near the peak point of the optical power, the output optical power of the SMZM 4 is not reduced largely (characteristic a in FIG. 6). On the other hand, since the states c and d in FIG. 5 are apart from the peak point of the optical power, the output optical power of the SMZM 4 is largely reduced (characteristics c and d in FIG. 6).

Thus, when the bias voltage is shifted in the X-axis direction with respect to the optimum value, the output optical power of the SMZM 4 is reduced, and the modulation efficiency is degraded. In the SMZM 4, as illustrated in FIG. 7, when the bias voltage is shifted from the optimum value in the X-axis direction, the peak value of the optical output is reduced. That is, when the bias voltage is controlled for the optimum value, the maximum optical output power is obtained. Therefore, in the SMZM 4, a preferable phase modulation is realized by optimizing the amplitudes of the modulation signals V1pp and V2pp and the bias voltages V1bias and V2bias applied to the optical waveguides 6 and 8.

According to this control, excellent optical modulation output can be obtained although the bias map of the SMZM 4 has X-axis direction dependence (change in optical intensity and level line interval). That is, the bias voltage and the drive amplitude can approach the optimum point, and a stable optical modulation output is obtained. In addition, it is not necessary to measure or acquire in advance the optimum drive amplitude and optimum bias voltage for each wavelength of carrier light.

The static characteristic of the SMZM 4 is variable for each device. In addition, as described above, the static characteristic changes with respect to the wavelength of carrier light. However, according to the configuration and method of the embodiments, the drive amplitude and the bias voltage can be optimized or approximately optimized by the feedback control based on the output optical signal. Therefore, it is not necessary to make an adjustment for each optical modulator to obtain the optimum point of the drive amplitude and the bias voltage. Furthermore, although the characteristics of the SMZM 4 are changed by temperature change, a change by aging, etc., the drive amplitude and the bias voltage can be optimized during the operation of the optical modulator. Therefore, the degradation of an optical signal by the foldback of waveform of an optical waveform, the degradation of extinction ratio, a cross point fluctuation, the reduction of the aperture of an optical waveform, etc. can be avoided.

Effect of the First Embodiment (1) Since a bias voltage and a drive amplitude are automatically adjusted according to the output optical signal of the SMZM 4, the bias voltage and the drive amplitude can be free of adjustments. Furthermore, it is not necessary to perform a process or an operation for acquiring data for the optimum bias and the optimum amplitude for each wavelength of carrier light in advance.

(2) Since a bias voltage and a drive amplitude are optimized or approximately optimized, the influence of a change by aging and a characteristic change of an optical modulator of the SMZM 4 etc. and its peripheral circuits (driver 28, controller 30, etc.) can be avoided, thereby preventing the degradation of an optical waveform.

Second Embodiment

Figure 8:
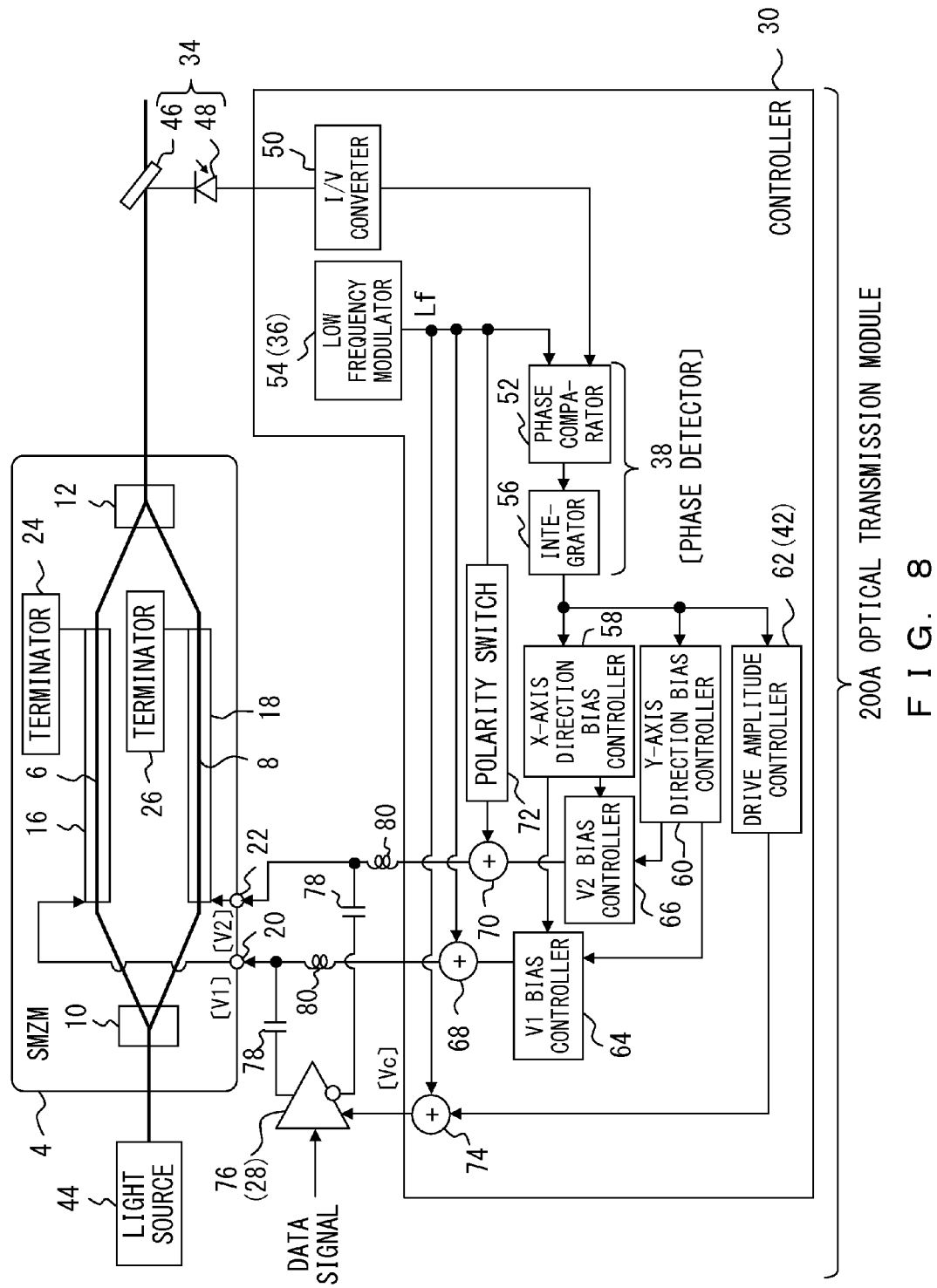
FIG. 8 illustrates an example of an optical transmission module according to the second embodiment.

Refer to FIG. 8 for the second embodiment. FIG. 8 illustrates an example of an optical transmission module according to the second embodiment. The configuration illustrated in FIG. 8 is an example, and the present invention is not limited to the configuration. In FIG. 8, the same component as in FIG. 1 is assigned the same reference numeral.

An optical transmission module 200A illustrated in FIG. 8 is an example of the optical modulator, the optical transmitter, and the optical modulation control method according to the present application. The optical transmission module 200A includes the SMZM 4, the controller 30, the driver 28, and the optical monitor 34 as with the optical modulator 2 illustrated in FIG. 1.

The optical transmission module 200A is provided with a light source 44 at the input side of the SMZM 4, and the output light of the light source 44 is guided to the SMZM 4. The light source 44 can be, for example, a DC light source. The light source 44 generates, for example, CW (continuous wave) light. The SMZM 4 includes the input terminals 20 and 22. The input terminal 20 is electrically coupled to the signal electrode 16 for applying an electric field to the optical waveguide 6, and the second input terminal 22 is electrically coupled to the signal electrode 18 for applying an electric field to the optical waveguide 8. The input voltages V1 and V2 are provided for the input terminals 20 and 22, respectively. The SMZM 4 modulates the phase of the transmission light of the optical waveguides 6 and 8 by the refractive index modulation by the electro-optical effect. As a result, a modulated optical signal is generated. The output optical signal of the SMZM 4 is monitored by the optical monitor 34. The optical monitor 34 includes, for example, an optical splitter 46 and a photo detector 48. In this case, the optical splitter 46 branches a part of the output optical signal of the SMZM 4 and guides the optical signal to the photo detector 48. The photo detector 48 converts the branched optical signal into an electric signal by generating a current depending on the branched optical signal. The photo detector 48 includes, for example, a photodiode.

The controller 30 includes a current/voltage (I/V) converter 50. The I/V converter 50 converts a current signal into a voltage signal. The I/V converter 50 can be configured to detect a low frequency component included in the optical signal. In this case, the I/V converter 50 obtains a voltage signal indicating the low frequency component in the output optical signal. The I/V converter 50 is realized by, for example, a transimpedance amplifier.

The output signal of the I/V converter 50 is guided to a phase comparator 52 of the phase detector 38. The phase comparator 52 detects the low frequency component in the output optical signal using the low frequency signal Lf generated by the low frequency modulator 54. An integrator 56 detects the power and the phase of the low frequency component in the output optical signal by integrating (that is, averaging) the output signal of the phase comparator 52. The integrator 56 provides the function of smoothing the output signal of the phase comparator 52 and removing the high frequency component. The integrator 56 may be configured by including, for example, a low pass filter. When the power of the low frequency component in the output optical signal is detected by the phase comparator 52, the integrator 56 can be omitted.

The low frequency modulator 54 is an example of a signal source of the low frequency signal Lf as a reference signal, and generates the low frequency signal Lf having a substantially constant amplitude. The frequency of the low frequency signal Lf is sufficiently lower than the bit rate or a symbol rate of the input data signal. In addition, it is assumed that the amplitude of the low frequency signal Lf is sufficiently smaller than the amplitude (that is, the drive amplitude) of the modulation signal output from a driver circuit 76. The low frequency signal Lf generated by the low frequency modulator 54 is guided to the phase comparator 52, an adder 74, an adder 68, and a polarity switch 72 as necessary.

The controller 30 further includes an X-axis direction bias controller (first bias controller) 58, a Y-axis direction bias controller (second bias controller) 60, a drive amplitude controller 62, a V1bias controller 64, and a V2bias controller 66.

The X-axis direction bias controller 58 controls the bias point of the SMZM 4 in the X-axis direction on the map illustrated in FIG. 3 so that the output signal of the integrator 56 (that is, the low frequency component in the output optical signal) is zero or minimized in the sequence of controlling the bias in the X-axis direction. That is, the X-axis direction bias controller 58 adjusts the bias point of the SMZM 4 in the X-axis direction by controlling the input voltages V1 and V2. In this case, the adjustment direction of the bias point on the X axis may be determined by the polarity (that is, positive or negative) of the output voltage of the integrator 56. Then, the bias voltages V1bias and V2bias respectively generated by the V1bias controller 64 and the V2bias controller 66 are controlled so that the output of the integrator 56 is zero or minimized. For example, when it is assumed that the amount of the change of the voltage of the bias voltage V1bias is $\Delta V1$, and the amount of the change of the voltage of the bias voltage V2bias is $\Delta V2$, the bias point moves in the X-axis direction when $\Delta V1=\Delta V2$. In the sequence of controlling the bias in the X-axis direction, $\Delta V1$ and $\Delta V2$ are calculated by the X-axis direction bias controller 58 according to the output signal of the integrator 56.

The Y-axis direction bias controller 60 controls the bias point of the SMZM 4 in the Y-axis direction so that the output signal of the integrator 56 (that is, the low frequency component in the output optical signal) is zero or minimized in the sequence of controlling the bias in the Y-axis direction. That is, the Y-axis direction bias controller 60 adjusts the bias point of the SMZM 4 in the Y-axis direction by controlling the input voltages V1 and V2. In this case, the adjustment direction of the bias point on the Y axis may be determined by the polarity (that is, positive or negative) of the output voltage of the integrator 56. Then, the bias voltages V1bias and V2bias respectively generated by the V1bias controller 64 and the V2bias controller 66 are controlled so that the output of the integrator 56 is zero or minimized. For example, when it is assumed that the amount of the change of the voltage of the bias voltage V1bias is $\Delta V1$, and the amount of the change of the voltage of the bias voltage V2bias is $\Delta V2$, the bias point moves in the X-axis direction when $\Delta V1=-\Delta V2$. In the sequence of controlling the bias in the Y-axis direction, $\Delta V1$ and $\Delta V2$ are calculated by the Y-axis direction bias controller 60 according to the output signal of the integrator 56.

The V1bias controller 64 generates the bias voltage V1bias based on the output of the X-axis direction bias controller 58 and the Y-axis direction bias controller 60. The V1bias controller 64 calculates the next bias voltage V1bias based on the current bias voltage V1bias, the output of the X-axis direction bias controller 58, and the output of the Y-axis direction bias controller 60. That is, the bias voltage V1bias is controlled according to the low frequency component in the output optical signal, and the bias voltage V1bias is optimized so that the low frequency component is zero or minimized.

The operation of the V2bias controller 66 is similar to the operation of the V1bias controller 64. However, the V2bias controller 66 generates the bias voltage V2bias based on the output of the X-axis direction bias controller 58 and the output of the Y-axis direction bias controller 60.

The adder 68 adds the low frequency signal Lf to the output signal of the V1bias controller 64. That is, the low frequency signal Lf is superimposed on the bias voltage V1bias. An adder 70 adds the output signal of the polarity switch 72 to the output signal of the V2bias controller 66. The polarity switch 72 reverses the polarity (or phase) of the low frequency signal Lf when a reverse instruction is received from the control circuit described later. That is, the low frequency signal Lf or the reversed low frequency signal Lf is superimposed on the bias voltage V2bias. In the sequence of controlling the bias in the X-axis direction, the polarity switch 72 does not reverse the low frequency signal Lf, thus the low frequency signal Lf is superimposed on the bias voltage V2bias. On the other hand, in the sequence of controlling the bias in the Y-axis direction, the polarity switch 72 reverses the low frequency signal Lf, thus the reversed low frequency signal Lf is superimposed on the bias voltage V2bias.

The drive amplitude controller 62 generates an amplitude control voltage Vc for controlling a drive amplitude so that the output signal of the integrator 56 (that is, the low frequency component of the output optical signal) is zero or minimized in the sequence of controlling the drive amplitude. In this case, the adjustment direction of the drive amplitude (that is, whether the drive amplitude is to be larger or smaller) may be determined by the polarity (that is, positive or negative) of the output voltage of the integrator 56.

The adder 74 adds the low frequency signal Lf to the output signal of the drive amplitude controller 62 in the sequence of controlling the drive amplitude. That is, the low frequency signal Lf is superimposed on the amplitude control voltage Vc. When the control of the drive amplitude is not performed, the low frequency signal Lf is not provided for the adder 74, and the amplitude control voltage Vc output from the adder 74 is a DC voltage.

The driver circuit 76 is an example of the driver 28 illustrated in FIG. 1, and generates a modulation signal (in-phase modulation signal V1$pp$, reversed-phase modulation signal V2$pp$) corresponding to the input data signal. The driver circuit 76 controls the amplitude (that is, drive amplitude) of the modulation signal based on the amplitude control voltage Vc provided by the controller 30. Therefore, in the sequence of controlling the drive amplitude, the amplitudes of the modulation signals V1$pp$ and V2$pp$ dithers in synchronization with the low frequency signal Lf.

The in-phase modulation signal V1$pp$ and the bias voltage V1bias are combined by the bias T circuit, and the resultant signal is provided as the input voltage V1 for the input terminal 20. The reversed-phase modulation signal V2$pp$ and the bias voltage V2bias are combined by the bias T circuit, and the resultant signal is provided as the input voltage V2 for the second input terminal 22. Each of the bias T circuits include a capacitor 78 electrically coupled to the driver circuit 76, and an inductor 80 electrically coupled to the controller 30. The capacitor 78 provides high impedance for the bias voltages V1bias and V2bias. The inductor 80 provides high impedance for the in-phase modulation signal V1pp and the reversed-phase modulation signal V2pp. Therefore, these combined signals are provided efficiently for the input terminals 20 and 22, respectively. The bias T circuits can be replaced by another circuit having a similar function.

Each of the adders 68, 70, and 74 operates as a superimposer. In this case, the superimposer may include the low frequency modulator 54. The superimposer may further include the polarity switch 72. The X-axis direction bias controller 58, the Y-axis direction bias controller 60, the drive amplitude controller 62, the V1bias controller 64, and the V2bias controller 66 operate as a "controller to control the bias voltage in the modulation direction, the bias voltage in the orthogonal direction, and the amplitude of a modulation signal". In this case, the controller may include the phase comparator 52 and the integrator 56.

Figure 9:
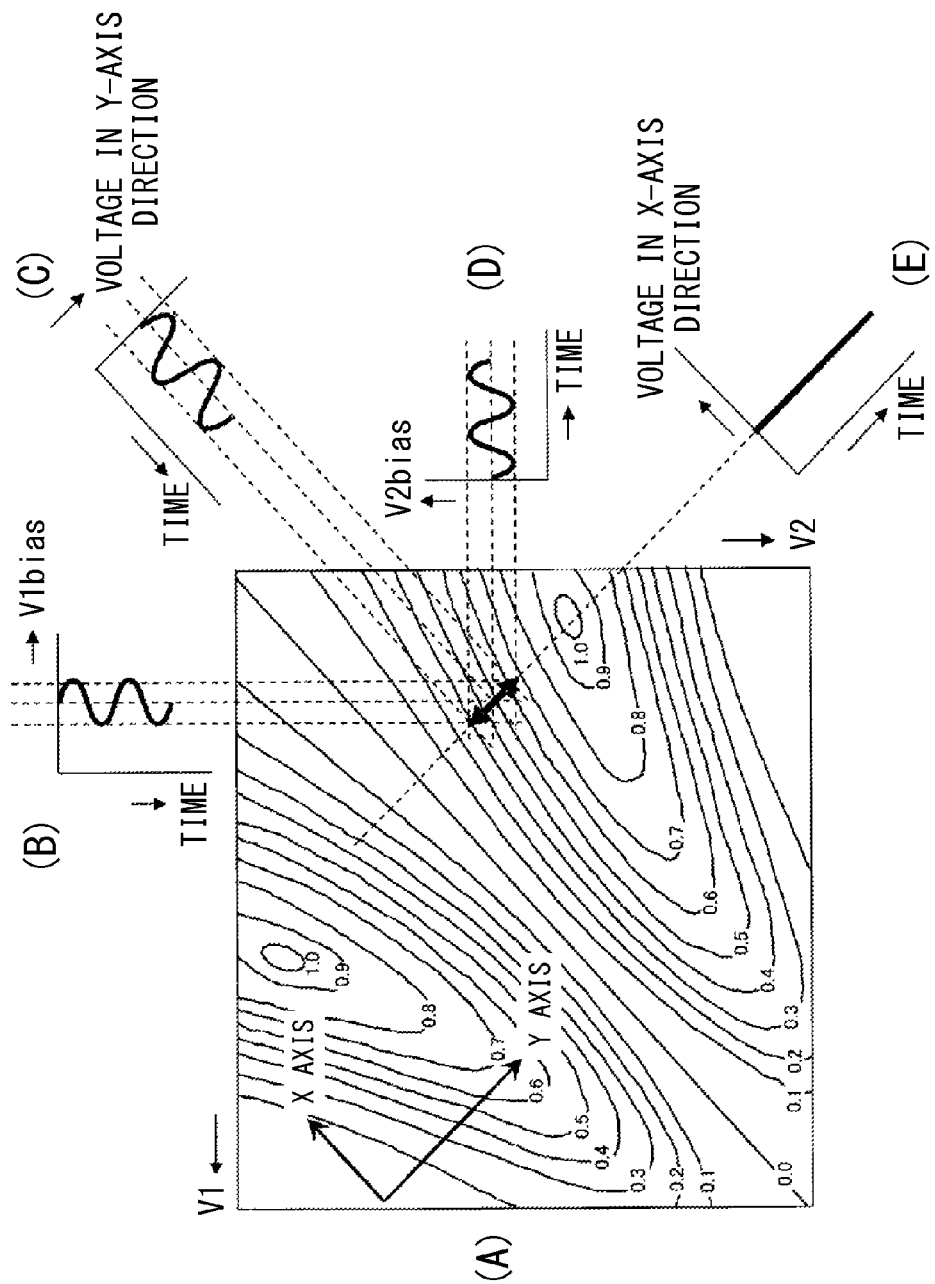
FIG. 9 illustrates an example of an operation when a low frequency is superimposed on Y-axis direction bias.

Next, refer to FIGS. 9 and 10 for the bias control in the Y-axis direction. FIG. 9 illustrates an example of an operation when a low frequency signal is superimposed on the bias voltage in the Y-axis direction. (A) of FIG. 9 illustrates the static characteristics of the SMZM 4. (B) of FIG. 9 illustrates a waveform of the bias voltage V1bias. (C) of FIG. 9 illustrates a voltage waveform in the Y-axis direction. (D) of FIG. 9 illustrates a waveform of the bias voltage V2bias. (E) of FIG. 9 illustrates a voltage waveform in the X-axis direction. FIG. 10 illustrates the phase of each waveform illustrated in (B)-(E) of FIG. 9.

In the bias control in the Y-axis direction, as illustrated in (B) of FIG. 9, an in-phase low frequency signal (non-reversed waveform) is superimposed on the input voltage V1. In addition, as illustrated in (D) of FIG. 9, a reversed-phase low frequency signal (reversed waveform) is superimposed on the input voltage V2. The bold arrow indicated in (A) of FIG. 9 refers to a change of the bias voltage in the Y-axis direction due to the low frequency signal.

Thus, when the in-phase low frequency signal and the reversed-phase low frequency signal, having the same amplitude, are superimposed on the input voltages V1 and V2, respectively, the low frequency signal is canceled in the X-axis direction. Therefore, as indicated by (E) of FIG. 9, the bias voltage in the X-axis direction is not changed. On the other hand, as indicated by (C) of FIG. 9, the voltage in the Y-axis direction is modulated by the low frequency signal.

In this case, as illustrated in FIG. 10, the in-phase low frequency signal Lf is superimposed on the input voltage V1 and the reversed-phase low frequency signal Lf is superimposed on the input voltage V2. As a result, since the in-phase low frequency signal Lf and the reversed-phase low frequency signal Lf are canceled, the bias voltage in the X-axis direction becomes a DC voltage at approximately constant level as illustrated in FIG. 10. On the other hand, the bias voltage in the Y-axis direction dithers at the same frequency as the low frequency signal Lf as illustrated in FIG. 10. The phase of the bias voltage in the Y-axis direction may be synchronous with the reversed-phase low frequency signal Lf.

Figure 11:
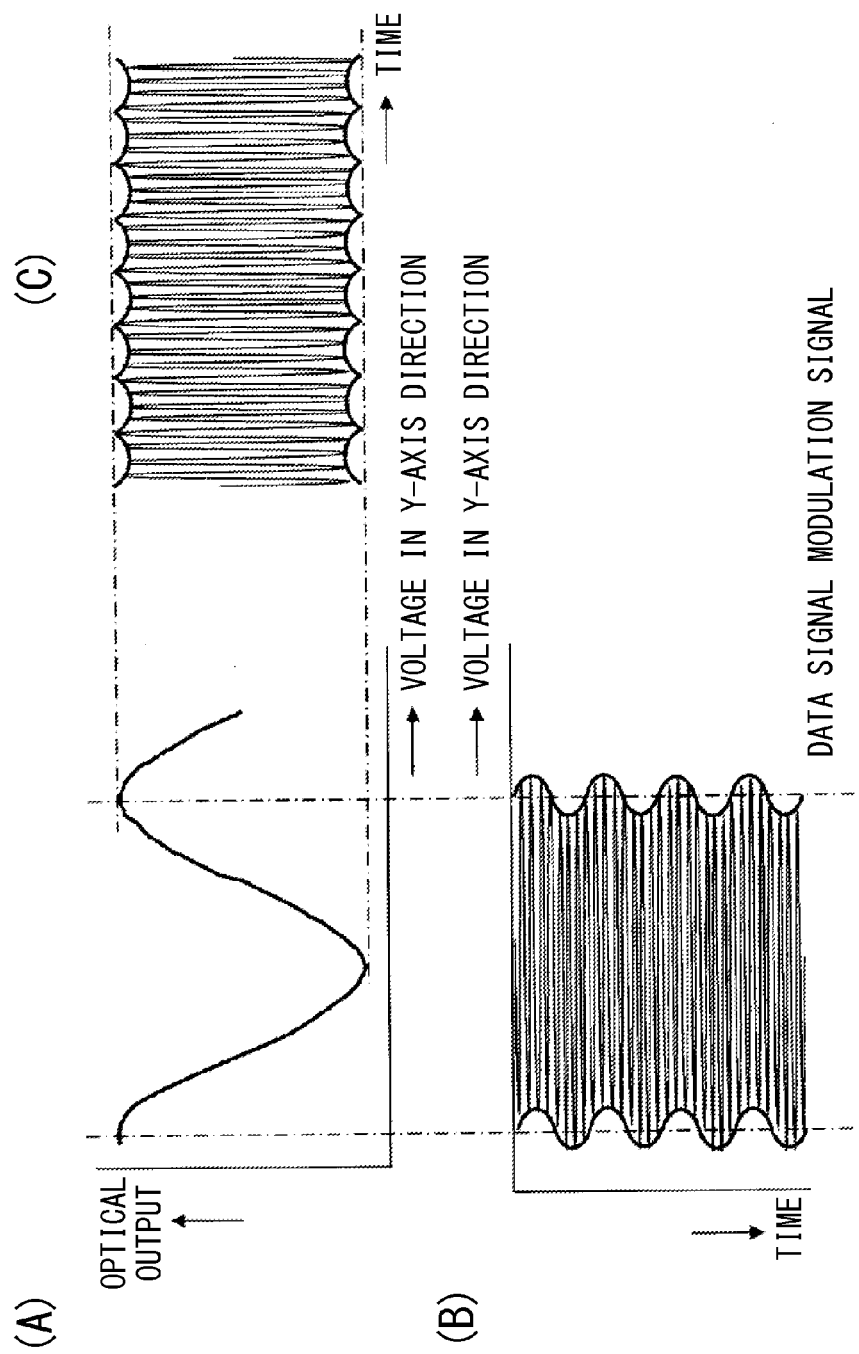
FIG. 11 illustrates an example of a control operation of a Y-axis direction bias.

Refer to FIGS. 11 and 12 for the bias control in the Y-axis direction. FIG. 11 illustrates an example of a bias control operation in the Y-axis direction. (A) of FIG. 11 illustrates the input/output characteristics of the SMZM 4. (B) of FIG. 11 illustrates the waveform of the data signal modulation signal. (C) of FIG. 11 illustrates the waveform of the output optical signal. FIG. 12 illustrates an example of the bias voltage in the Y-axis direction, the data signal modulation signal, and the output optical signal in the operation illustrated in FIG. 11.

In this example, the data signal modulation signal indicated by (B) of FIG. 11 is applied to the SMZM 4 having the operation characteristic indicated by (A) of FIG. 11. The data signal modulation signal is provided as the input voltages V1 and V2 for the SMZM 4. In the sequence of controlling the bias in the Y-axis direction, the bias voltages V1bias and V2bias are modulated by the low frequency signal Lf. Therefore, the data signal modulation signal includes the component of the low frequency signal Lf as indicated by (B) of FIG. 11. The SMZM 4 outputs the optical signal indicated by (C) of FIG. 11.

In the sequence of controlling the bias in the Y-axis direction, as indicated by (A) of FIG. 12, the bias voltage in the Y-axis direction is modulated by the low frequency signal Lf. That is, the bias voltage in the Y-axis direction dithers at the frequency as the low frequency signal Lf. Therefore, the data signal modulation signal includes the component of the low frequency signal Lf as indicated by (B) of FIG. 12.

However, when the bias voltage in the Y-axis direction is optimized, the low frequency component in the optical output becomes zero as indicated by (C) of FIG. 12. In this case, the output optical signal includes double component of the frequency of the low frequency signal Lf. On the other hand, when the bias voltage in the Y-axis direction is shifted toward the positive side from the optimum value, the output optical signal includes the reversed-phase low frequency component with respect to the low frequency signal Lf as indicated by (D) of FIG. 12. When the bias voltage in the Y-axis direction is shifted toward the negative side from the optimum value, the output optical signal includes the in-phase low frequency component with respect to the low frequency signal Lf as indicated by (E) of FIG. 12.

Therefore, the controller 30 can determine the adjustment direction if the low frequency component in the output optical signal is detected and the phase of the detected low frequency component is compared with that of the low frequency signal Lf. That is, when the low frequency component having the same phase as the low frequency signal Lf is detected, the controller 30 shifts the bias voltage in the Y-axis direction in the positive direction, thereby making the bias voltage approach the optimum point. Similarly, when the low frequency component having the reversed phase with respect to the low frequency signal Lf is detected, the controller 30 makes the bias voltage approach the optimum point by shifting the bias voltage in the Y-axis direction in the negative direction. According to this feedback control, the bias voltage approaches the optimum point. Meanwhile, this feedback control is substantially equivalent to the control of reducing the low frequency component in the output optical signal. Therefore, the controller minimizes the low frequency component in the output optical signal, and thus optimizes the bias voltage in the Y-axis direction.

Figure 13:
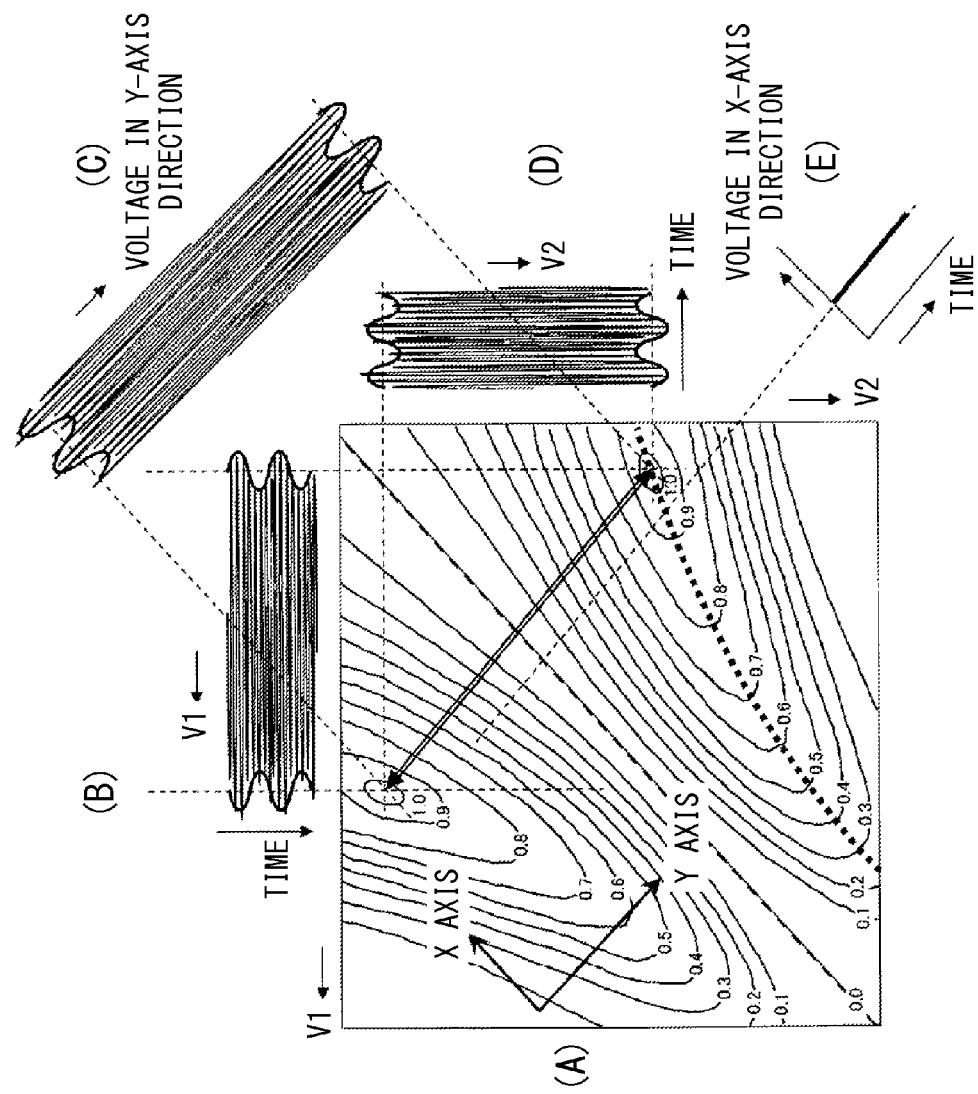
FIG. 13 illustrates an example of an operation when a low frequency is superimposed on a drive amplitude control signal.

Next, refer to FIGS. 13 and 14 for the drive amplitude control in the Y-axis direction. FIG. 13 illustrates the operation when the low frequency signal is superimposed on the amplitude control voltage Vc. (A) of FIG. 13 illustrates the static characteristic of the SMZM 4. (B) of FIG. 13 illustrates the waveform of the input voltage V1 (C) of FIG. 13 illustrates the voltage waveform in the Y-axis direction. (D) of FIG. 13 illustrates the waveform of the input voltage V2. (E) of FIG. 13 illustrates the voltage waveform in the X-axis direction. FIG. 14 illustrates the phase of the waveform indicated by (B)-(E) of FIG. 13.

In the drive amplitude control in the Y-axis direction, for example, the low frequency signal Lf is superimposed on the amplitude control voltage Vc. As a result, as indicated by (B) and (D) of FIG. 13, the low frequency signal Lf is superimposed on each of the input voltages V1 and V2. That is, the input voltages V1 and V2 are amplitude-modulated by the low frequency signal Lf. Note that, in (A) of FIG. 13, the arrow indicated by double lines refers to a voltage change in the Y-axis direction.

In the control of the drive amplitude in the Y-axis direction, the controller 30 superimposes the low frequency signal Lf on the amplitude control voltage Vc. As a result, as indicated by (C) of FIG. 13, the voltage modulated by the low frequency signal Lf in the Y-axis direction is generated. However, in this embodiment, a pair of the data signal modulation signals generated by the driver circuit 76 form a differential signal. Therefore, in the X-axis direction, the low frequency signal Lf is canceled. Accordingly, the voltage in the X-axis direction is approximately DC voltage at a constant level as indicated by (E) of FIG. 13.

In the sequence of controlling the drive amplitude, the low frequency signal Lf is superimposed on the amplitude control voltage Vc as indicated by (A) of FIG. 14. The driver circuit 76 is driven by the amplitude control voltage Vc. Thus, the in-phase data signal modulation signal indicated by (B) of FIG. 14 and the reversed-phase data signal modulation signal indicated by (C) of FIG. 14 are generated. The data signal modulation signal is a symmetrical amplitude modulation signal indicating the same change on the high and low potential sides. Therefore, the voltage signal in the Y-axis direction is amplitude-modulated by the low frequency signal Lf as indicated by (D) of FIG. 14.

Figure 15:
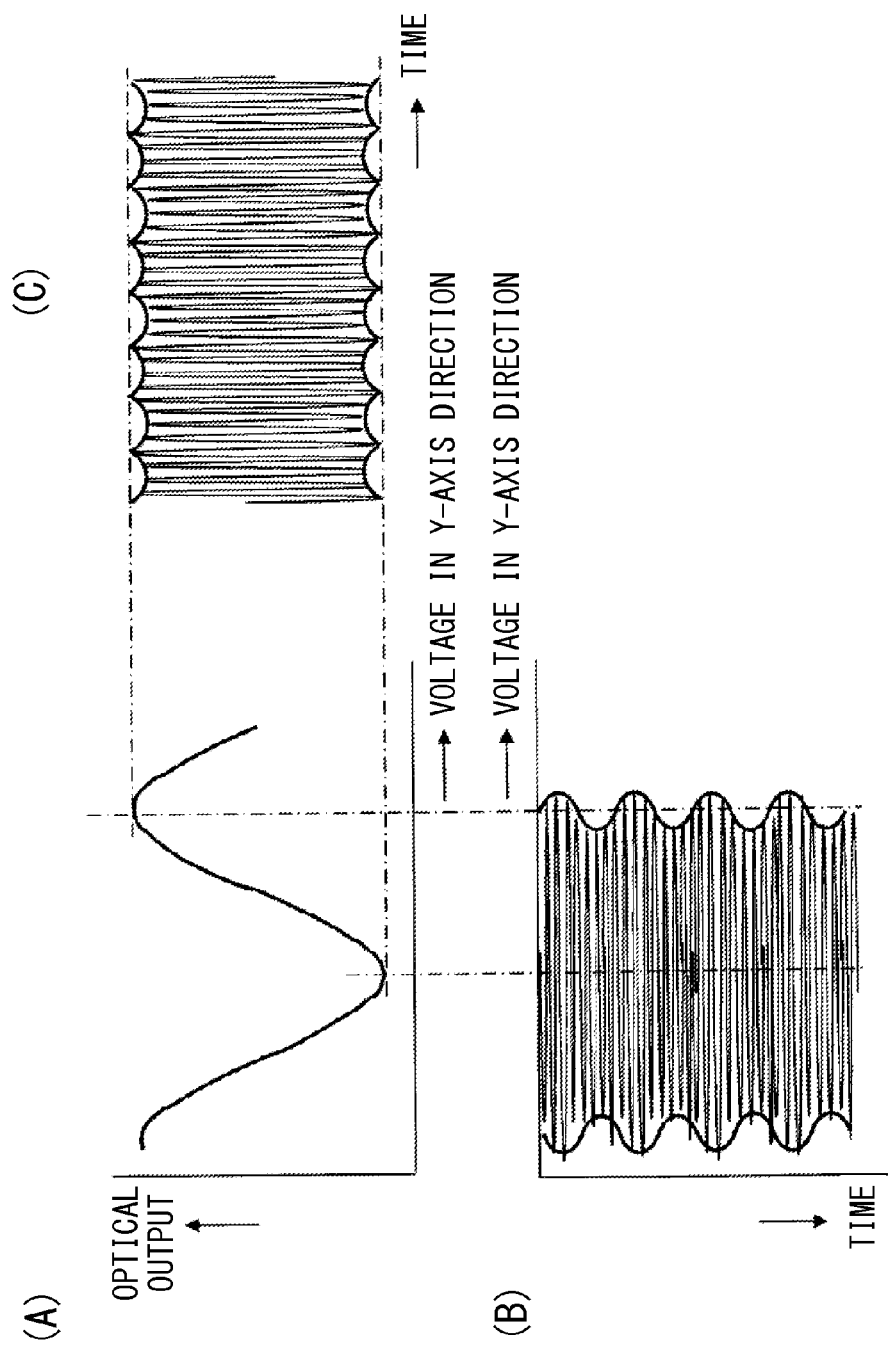
FIG. 15 illustrates an example of a control operation of the drive amplitude in the Y-axis direction.

Refer to FIGS. 15 and 16 for the drive amplitude control in the Y-axis direction. FIG. 15 illustrates an example of the drive amplitude control in the Y-axis direction. (A) of FIG. 15 illustrates the input/output characteristics of the SMZM 4. (B) of FIG. 15 illustrates the waveform of the data signal modulation signal. (C) of FIG. 15 illustrates the waveform of the output optical signal. FIG. 16 illustrates an example of the amplitude control voltage Vc, the data signal modulation signal, and output optical signal in the operation illustrated in FIG. 15.

In this example, the data signal modulation signal illustrated in (B) of FIG. 15 is input to the SMZM 4 having the input/output characteristic indicated by (A) of FIG. 15. In the sequence of controlling the drive amplitude, the drive amplitude voltage Vc is modulated by the low frequency signal Lf. Therefore, the amplitude of the data signal modulation signal includes the component of the low frequency signal Lf as indicated by (B) of FIG. 15. Thus, the SMZM 4 outputs the optical signal illustrated in (C) of FIG. 15.

As indicated by (A) of FIG. 16, the amplitude control voltage Vc is modulated by the low frequency signal Lf. The driver circuit 76 generates the data signal modulation signal from the input data signal based on the amplitude control voltage Vc. Therefore, the amplitude of the data signal modulation signal is symmetrical amplitude modulated according to the low frequency signal Lf. With the input/output characteristic illustrated in (A) of FIG. 15, when the voltage in the Y-axis direction exceeds a voltage for the peak output optical power of the SMZM 4, the "fold-back" occurs in the output optical signal waveform of the SMZM 4. (C) of FIG. 15 and (C) of FIG. 16 illustrate the waveform of the optical signal in which the fold-back occurs in the same frequency as the low frequency signal Lf.

When the drive amplitude is optimized in the sequence of controlling the drive amplitude in the Y-axis direction, the low frequency component in the output optical signal is zero as indicated by (C) of FIG. 16. In this case, the output optical signal includes double frequency component of the low frequency signal Lf. On the other hand, when the drive amplitude is smaller than the optimum value, the output optical signal includes the in-phase low frequency component of the low frequency signal Lf as indicated by (D) of FIG. 16. When the drive amplitude is larger than the optimum value, the output optical signal includes the reversed-phase low frequency component with respect to the low frequency signal Lf as indicated by (E) of FIG. 16.

Therefore, the controller 30 can determine the adjustment direction by detecting the low frequency component in the output optical signal, and by comparing the phases between the detected low frequency component and the low frequency signal Lf. That is, when the controller 30 detects a low frequency component having the same phase as the low frequency signal Lf, the controller 30 increases the drive amplitude to make the drive amplitude approach the optimum value. When the controller 30 detects a low frequency component having the reversed phase with respect to the low frequency signal Lf, the controller 30 reduces the drive amplitude to make the drive amplitude approach the optimum value. In this operation, the feedback control is substantially equivalent to the control of reducing the low frequency component in the output optical signal. Therefore, this feedback control minimizes the low frequency component in the output optical signal, thereby optimizing the drive amplitude.

Figure 17:
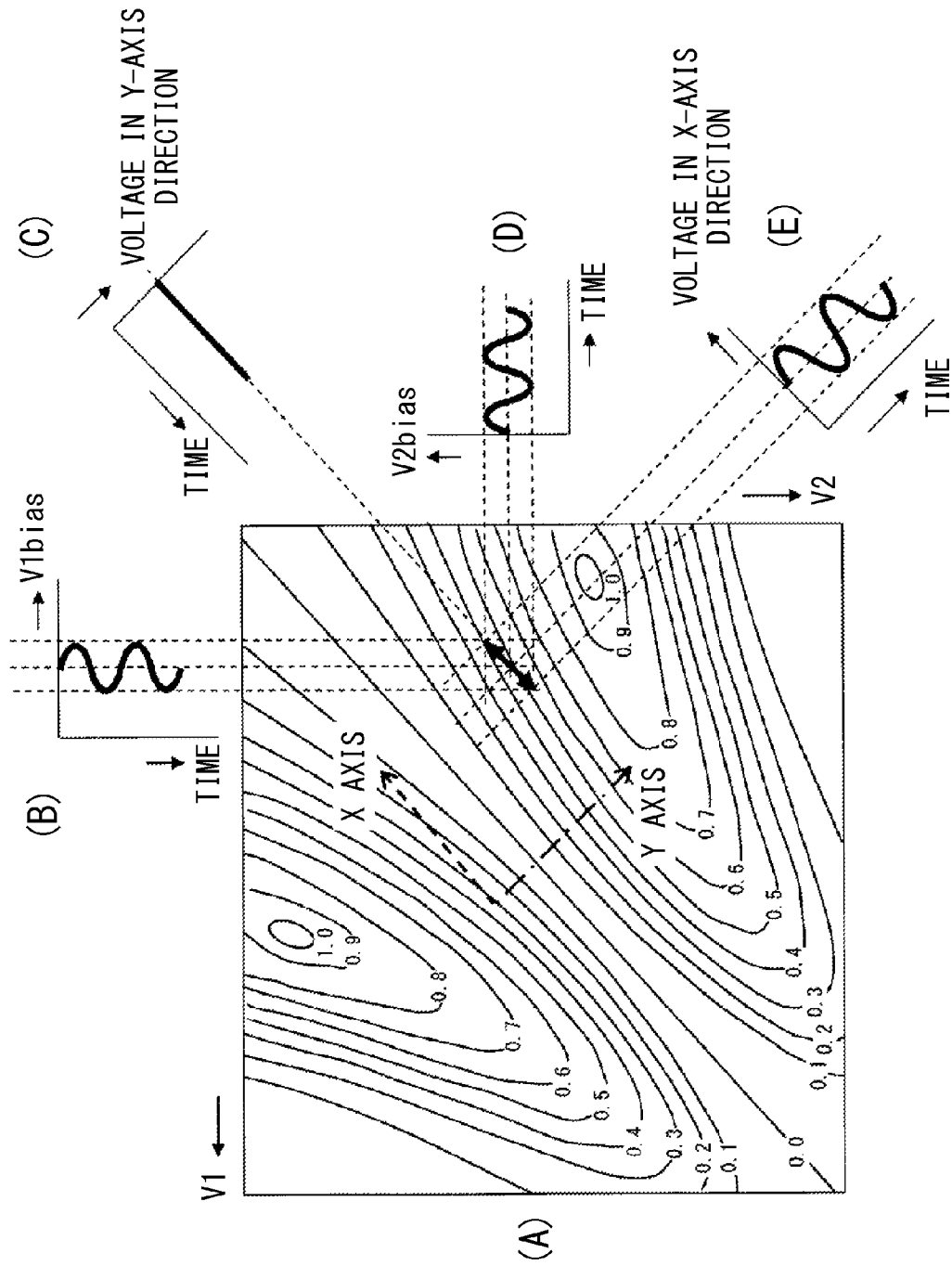
FIG. 17 illustrates an example of an operation when a bias voltage in the X-axis direction is modulated.
Figure 18:
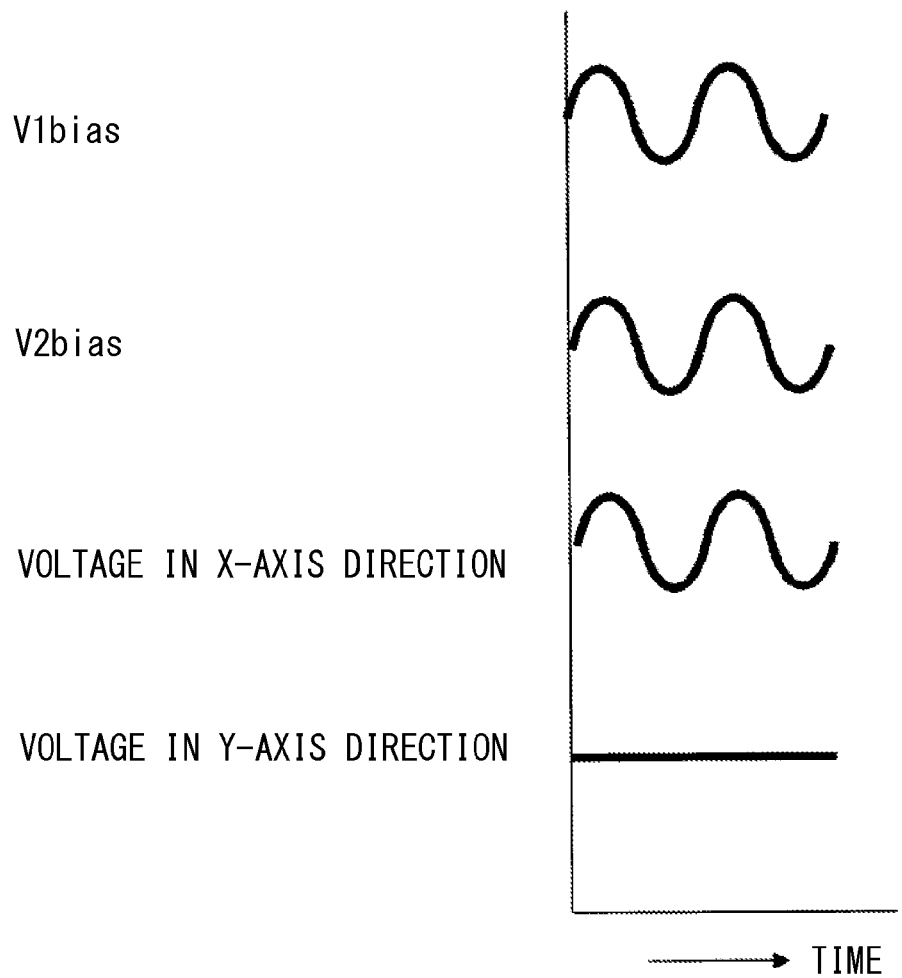
FIG. 18 illustrates an example of V1bias, V2bias, and voltage waveforms in the X and Y-axis directions.

Next, refer to FIGS. 17 and 18 for the bias control in the X-axis direction. FIG. 17 illustrates an example of the bias control operation in the X-axis direction. (A) of FIG. 17 illustrates the static characteristic of the SMZM 4. (B) of FIG. 17 illustrates the waveform of the bias voltage V1bias. (C) of FIG. 17 illustrates the voltage waveform in the Y-axis direction. (D) of FIG. 17 illustrates the waveform of the bias voltage V2bias. (E) of FIG. 17 illustrates the voltage waveform in the X-axis direction. FIG. 18 illustrates the bias voltage V1bias, the bias voltage V2bias, the voltage in the X-axis direction, and the voltage in the Y-axis direction in the operation illustrated in FIG. 17.

In the bias control in the X-axis direction, the low frequency signal Lf is superimposed on the bias voltage in the X-axis direction. The bold arrow on the map indicated by (A) of FIG. 17 represents the voltage dithering for the bias control in the X-axis direction. In the bias control, the bias voltage V1bias on which the low frequency signal Lf is superimposed as illustrated in (B) of FIG. 17 and the bias voltage V2bias on which the low frequency signal Lf is superimposed as illustrated in (D) of FIG. 17 are used. In this case, the voltage in the Y-axis direction is not changed by the low frequency signal Lf as illustrated in (C) of FIG. 17. On the other hand, as illustrated in (E) of FIG. 17, the voltage in the X-axis direction is modulated by the low frequency signal Lf.

The superimposition of the low frequency signal Lf on the voltage in the X-axis direction is realized by superimposing the low frequency signal Lf of the same phase on both of the bias voltages V1bias and V2bias. That is, as illustrated in (A) and (B) of FIG. 18, when the bias voltages V1bias and V2bias are amplitude-modulated according to the low frequency signal Lf of the same amplitude and the same phase, the low frequency signal Lf is canceled in the Y-axis direction. As a result, as illustrated in (D) of FIG. 18, the voltage in the Y-axis direction is approximately DC voltage at a constant level. On the other hand, the voltage in the X-axis direction is modulated by the low frequency signal Lf as illustrated in (C) of FIG. 18.

Figure 19:
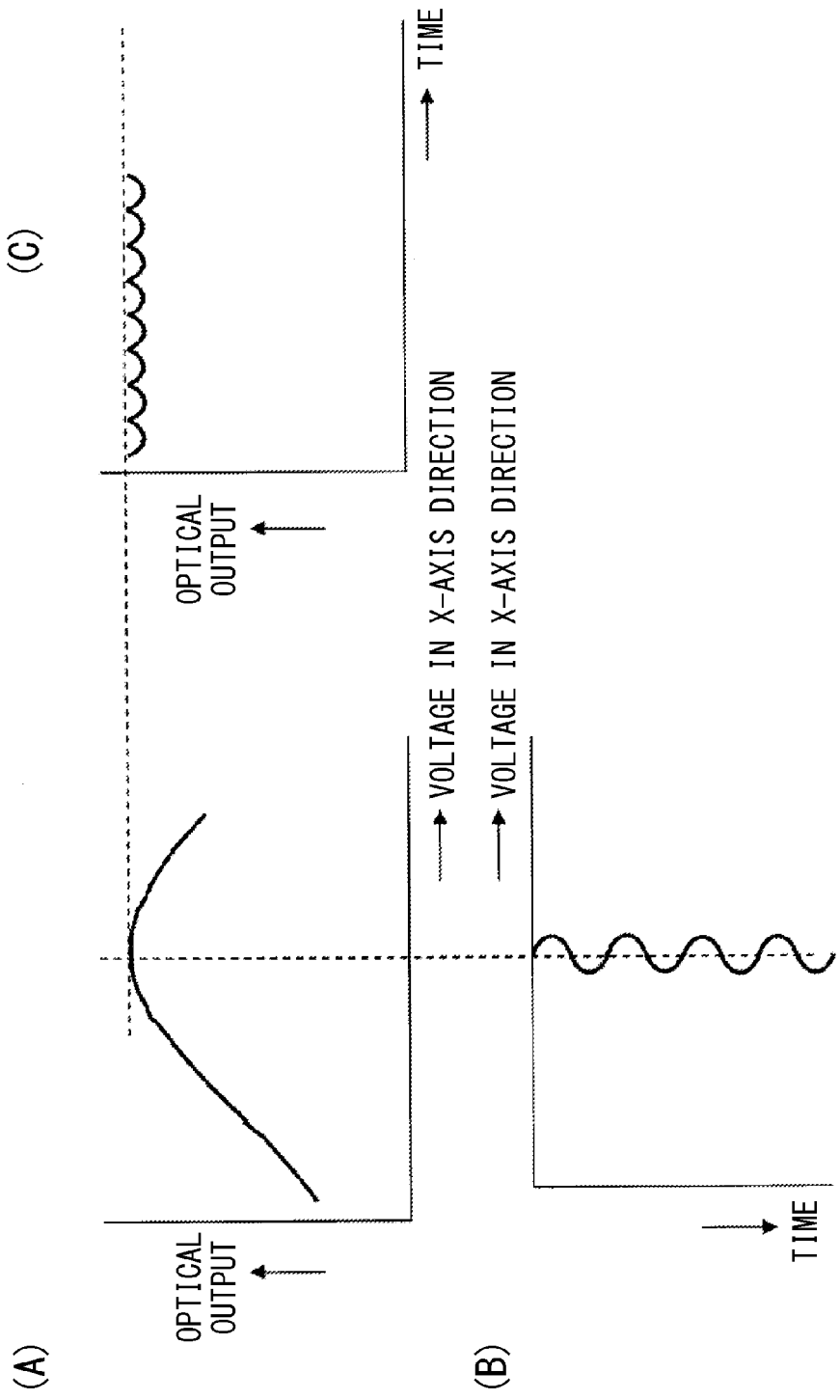
FIG. 19 illustrates an example of a control operation of a X-axis direction bias.

Further refer to FIGS. 19 and 20 for the control of the X-axis bias. FIG. 19 illustrates an example of an operation of controlling the X axis bias. (A) of FIG. 19 indicates the optical output characteristic with respect to the voltage in the X-axis direction. (B) of FIG. 19 indicates the voltage waveform in the X-axis direction. (C) of FIG. 19 indicates the waveform of the output optical signal. FIG. 20 illustrates the bias voltage in the X-axis direction and the optical output power in the operation in FIG. 19.

In this example, the voltage signal in the X-axis direction indicted by (B) of FIG. 19 is input to the SMZM 4 having the characteristic indicated by (A) of FIG. 19. In the sequence of controlling the bias voltage in the X-axis direction, the voltage in the X-axis direction is modulated by the low frequency signal Lf. The SMZM 4 outputs the optical signal indicated by (C) of FIG. 19. FIG. 19 illustrates the state in which the bias voltage in the X-axis direction is optimized.

In the sequence of controlling the bias voltage in the X-axis direction, the voltage in the X-axis direction is modulated by the low frequency signal Lf as indicated by (A) of FIG. 20. When the bias voltage in the X-axis direction is optimum, the low frequency component in the output optical signal is zero as indicated by (B) of FIG. 20. In this case, the output optical signal includes double frequency component of the low frequency signal Lf. When the bias voltage in the X-axis direction is shifted from the optimum to the positive side, the output optical signal includes the reversed-phase low frequency component with respect to the low frequency signal Lf. When the bias voltage in the X-axis direction is shifted from the optimum value to the negative side, the output optical signal includes the in-phase low frequency component with respect to the low frequency signal Lf.

Therefore, the controller 30 can determine the direction of adjustment by detecting the low frequency component in the output optical signal and comparing the phases between the detected low frequency component and the low frequency signal Lf. That is, when the controller 30 detects the in-phase low frequency component with respect to the low frequency signal Lf, the controller 30 shifts the bias voltage in the X-axis direction to the positive direction to make the bias voltage approach the optimum point. Similarly, when the controller 30 detects the reversed-phase low frequency component with respect to the low frequency signal Lf, the controller 30 shifts the bias voltage in the X-axis direction to the negative direction to make the bias voltage approach the optimum point. This feedback control is substantially equivalent to the control of reducing the low frequency component in the output optical signal. Therefore, this feedback control reduces the low frequency component in the output optical signal, thereby optimizing the bias voltage in the X-axis direction.

As described above, the controller 30 of the optical transmission module 200A includes the low frequency modulator 54 for generating the low frequency signal Lf. The controller 30 modulates the bias voltage of the SMZM 4 in the X-axis direction by the low frequency signal Lf in the sequence of controlling the bias voltage in the X-axis direction. Similarly, the controller 30 modulates the bias voltage of the SMZM 4 in the Y-axis direction by the low frequency signal Lf in the sequence of controlling the bias voltage in the Y-axis direction. In addition, the controller 30 may amplitude-modulates the modulation signal for driving the SMZM 4 by the low frequency signal Lf.

The optical monitor 34 includes the optical splitter 46 for branching apart of the output optical signal of the SMZM 4, and the photo detector 48 for converting the branched optical signal into an optical current. The controller 30 includes the I/V converter 50 to convert the current signal generated by the photo detector 48 into a voltage signal. Thus, the optical monitor 34 monitors the output optical signal, and the electric signal indicating the output optical signal is provided for the controller 30, thereby realizing high efficiency drive control.

The controller 30 has the phase detector 38 including the phase comparator 52 and the integrator 56. The phase detector 38 detects the power and the phase of the low frequency component included in the output optical signal.

The controller 30 includes the X-axis direction bias controller 58, the Y-axis direction bias controller 60, and the drive amplitude controller 62, and performs the control of the bias voltage in the X-axis direction, the control of the bias voltage in the Y-axis direction, and the control of the amplitude of a modulation signal based on the low frequency component in the output optical signal. According to this control operation, the amplitude of the modulation signal and the bias voltage are optimized or approximately optimized.

Third Embodiment

Figure 21:
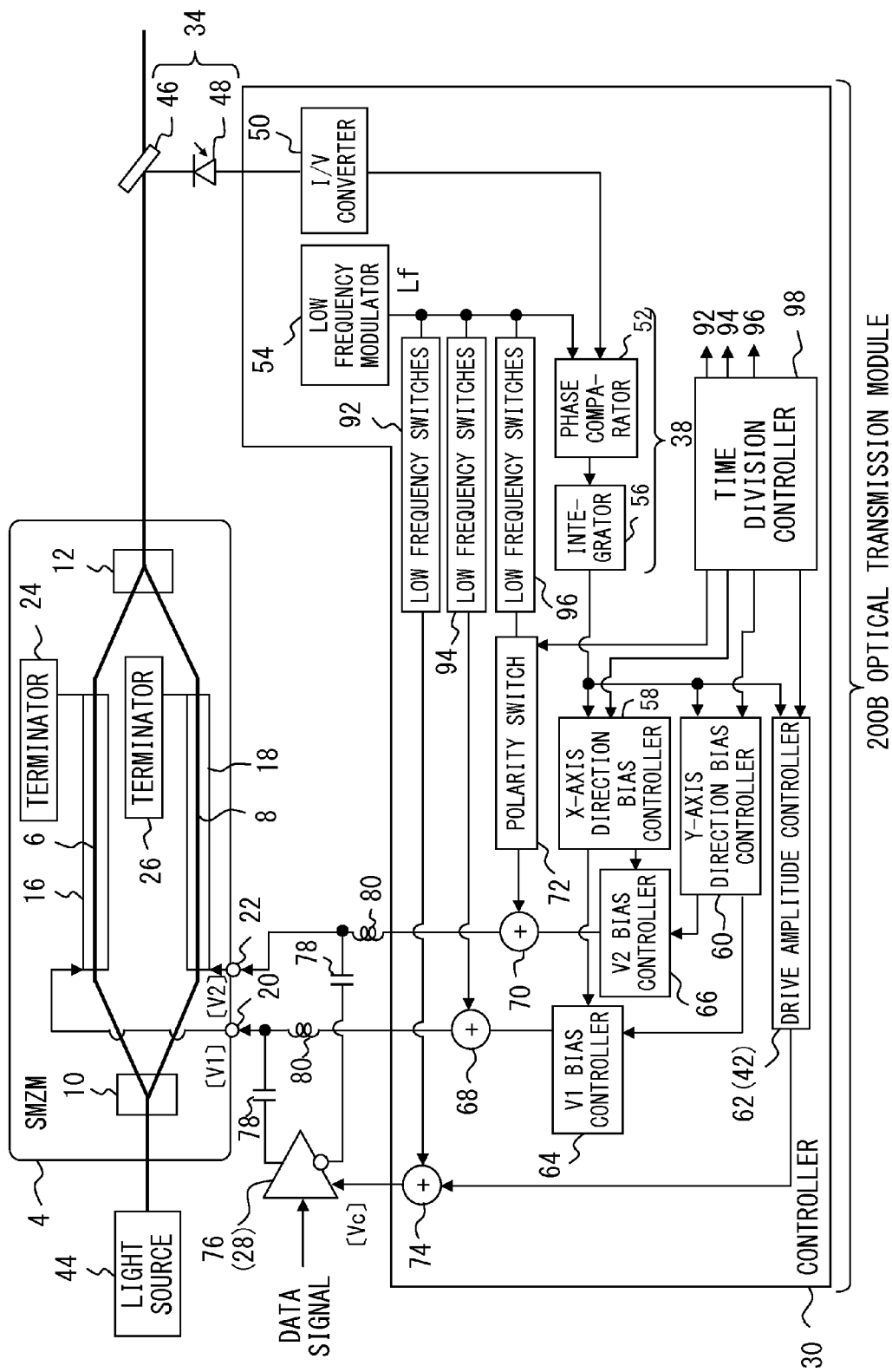
FIG. 21 illustrates an example of an optical transmission module according to the third embodiment.

Refer to FIG. 21 for the third embodiment. FIG. 21 illustrates an example of a configuration of the optical transmission module according to the third embodiment. In FIG. 21, the same components illustrated in FIGS. 1 and 8 are assigned the same reference numerals.

An optical transmission module 200B illustrated in FIG. 21 is an example of the optical modulator, the optical transmitter, and the optical modulation control method according to the present application. The optical transmission module 200B includes the SMZM 4, the controller 30, the driver 28 (driver circuit 76), and the optical monitor 34. The light source 44 is provided at the input side of the SMZM 4.

The controller 30 of the optical transmission module 200B performs the superimposition of the low frequency signal Lf, the control of the bias voltage, and the control of the drive amplitude by the time division scheme. In the controller 30, the low frequency signal Lf generated by the low frequency modulator 54 is guided to the phase comparator 52, and low frequency switches 92, 94, and 96. The low frequency switches 92, 94, and 96 are controlled into the ON state or the OFF state at the instruction from the time division controller 98. The low frequency switches 92, 94, and 96 pass the low frequency signal Lf in the ON state. The low frequency switches 92, 94, and 96 block the low frequency signal Lf in the OFF state. Therefore, when the low frequency switches 92, 94, and 96 are controlled into the ON state, the low frequency signal Lf is guided to the adders 74, 68, and 70, respectively. However, the polarity switch 72 is provided between the low frequency switch 96 and the adder 70. Thus, when a reverse instruction is issued from the time division controller 98, the reversed low frequency signal Lf is provided to the adder 70.

The time division controller 98 controls the operation of each element in the controller 30 by time division scheme. That is, the time division controller 98 controls the operation of the X-axis direction bias controller 58, the Y-axis direction bias controller 60, the drive amplitude controller 62, and the polarity switch 72. The time division controller 98 controls the state of the low frequency switches 92, 94, and 96. Furthermore, the time division controller 98 provides the operation mode of modulating the bias voltage by the low frequency signal Lf and the operation mode of modulating the amplitude of the modulation signal by the low frequency signal Lf by controlling the polarity switch 72. The time division controller 98 includes, for example, a clock circuit to switch the operation mode of the controller 30 at specified time intervals.

Figure 22:
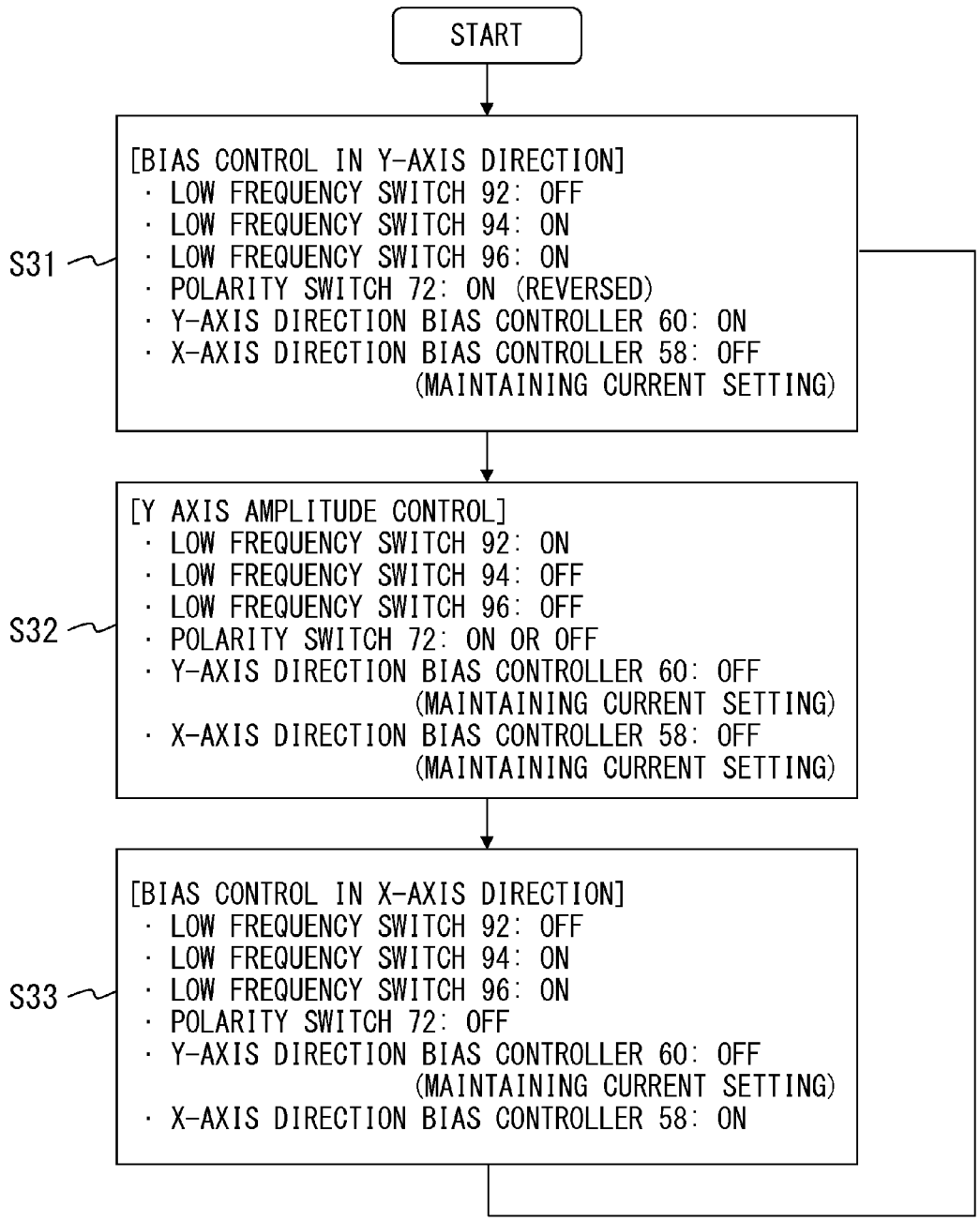
FIG. 22 is a flowchart of an example of a control operation.

Refer to FIG. 22 for the controlling operation of the optical transmission module 200B. FIG. 22 is a flowchart of the procedure of the controlling operation. In the control procedure of the optical transmission module 200B, the bias control in the Y-axis direction (S31), the Y axis amplitude control (S32), and the bias control in the X-axis direction (S33) are repeatedly performed.

In the bias control in the Y-axis direction (S31), the time division controller 98 controls the low frequency switches 92, 94, and 96 into the OFF state, the ON state, and the ON state, respectively. The time division controller 98 controls the polarity switch 72 to perform the reverse operation (ON state: reverse operation). Furthermore, the time division controller 98 controls the Y-axis direction bias controller 60 into the operating state (ON), and controls the X-axis direction bias controller 58 into the non-operating state (OFF: maintaining the current setting). The time division controller 98 controls the drive amplitude controller 62 into non-operating state (OFF). Thus, during S31 is performed, the amplitude of the modulation signal is fixed.

In S31, the control operation explained with reference to FIGS. 9-12 is realized. That is, the adder 68 superimposes the low frequency signal Lf on the bias voltage V1bias, and the adder 70 superimposes the reversed low frequency signal Lf on the bias voltage V2bias. In this case, the bias voltage in the Y-axis direction is modulated by the low frequency signal Lf as illustrated in (D) of FIG. 10. Therefore, the output optical signal of the SMZM 4 includes the frequency component (that is, the low frequency component) of the low frequency signal Lf. The Y-axis direction bias controller 60 controls the V1bias controller 64 and the V2bias controller 66 to reduce the low frequency component in the output optical signal. As a result, the bias voltage in the Y-axis direction is optimized or approximately optimized.

In the Y axis amplitude control (S32), the time division controller 98 controls the low frequency switches 92, 94, and 96 into the ON state, the OFF state, and the OFF state, respectively. The time division controller 98 controls the Y-axis direction bias controller 60 and the X-axis direction bias controller 58 into the non-operating state (OFF: maintaining the current setting). Thus, during S32 is performed, the bias voltage (both in X-axis direction and Y-axis direction) applied to the SMZM 4 is fixed. Note that when the Y axis amplitude is controlled, the low frequency switch 96 is controlled into the OFF state, and the low frequency signal Lf is not guided to the polarity switch 72. Therefore, the polarity switch 72 can be in the ON state or the OFF state.

In S32, the operation explained with reference to FIGS. 13-16 is realized. That is, the adder 74 superimposes the low frequency signal Lf on the amplitude control voltage Vc. In this case, the amplitude of the modulation signal generated by the driver circuit 76 is modulated by the low frequency signal Lf as indicated by (B) and (C) of FIG. 14. Therefore, the output optical signal of the SMZM 4 includes the low frequency component. The drive amplitude controller 62 controls the amplitude control voltage Vc to reduce the low frequency component. As a result, the drive amplitude is optimized or approximately optimized.

In the bias control in the X-axis direction (S33), the time division controller 98 controls the low frequency switches 92, 94, and 96 into the OFF state, the ON state, and the ON state, respectively. In addition, the time division controller 98 controls the polarity switch 72 not to perform the reverse operation (OFF: non-reverse operation). Furthermore, the time division controller 98 controls the Y-axis direction bias controller 60 into the non-operating state (OFF), and controls the X-axis direction bias controller 58 into the operating state (ON). The time division controller 98 controls the drive amplitude controller 62 into non-operating state (OFF). Thus, during S33 is performed, the amplitude of the modulation signal is fixed.

In S33, the operation explained with reference to FIGS. 17-20 is realized. That is, the adder 68 superimposes the low frequency signal Lf on the bias voltage V1bias, and the adder 70 superimposes the low frequency signal Lf on the bias voltage V2bias. In this case, the bias voltage in the X-axis direction is modulated by the low frequency signal Lf as illustrated in FIG. 18. Therefore, the output optical signal of the SMZM 4 includes the low frequency component. The X-axis direction bias controller 58 controls the V1bias controller 64 and the V2bias controller 66 to reduce the low frequency component. As a result, the bias voltage in the X-axis direction is optimized or approximately optimized.

By performing the process in S32, the bias voltage in the Y-axis direction optimized in S31 may be shifted from the optimum value. In addition, by performing the process in S33, the bias voltage in the Y-axis direction optimized in S31, and/or drive amplitude optimized in S32 may be shifted from the optimum value. Therefore, the controller 30 may repeatedly perform the processes in S31-S33. In this case, the controller 30 may repeatedly perform the processes in S31-S33 for a specified number of times. In addition, the controller 30 may repeatedly perform the processes in S31-S33 until each of the bias voltage in the Y-axis direction, the drive amplitude, and the bias voltage in the X-axis direction sufficiently converges.

Thus, in the third embodiment, the Y-axis direction bias controller 60, the X-axis direction bias controller 58, and the drive amplitude controller 62 selectively operate under the time division control by the time division controller 98. In the third embodiment, the bias in the X-axis direction, the bias in the Y-axis direction, and the amplitude of the modulation signal are controlled using one low frequency signal Lf. In this case, the low frequency signal Lf superimposed on one of the bias voltages V1 and V2 is used as is in the operation mode for controlling the X axis bias, and is used after reversed by the polarity switch 72 in the operation mode for controlling the Y axis bias.

Furthermore, in the third embodiment, the bias voltage in the X-axis direction, the bias voltage in the Y-axis direction, and the drive amplitude of the modulation signal are respectively controlled in different time section. Therefore, the accuracy of each controlling operation is high.

Fourth Embodiment

Figure 23:
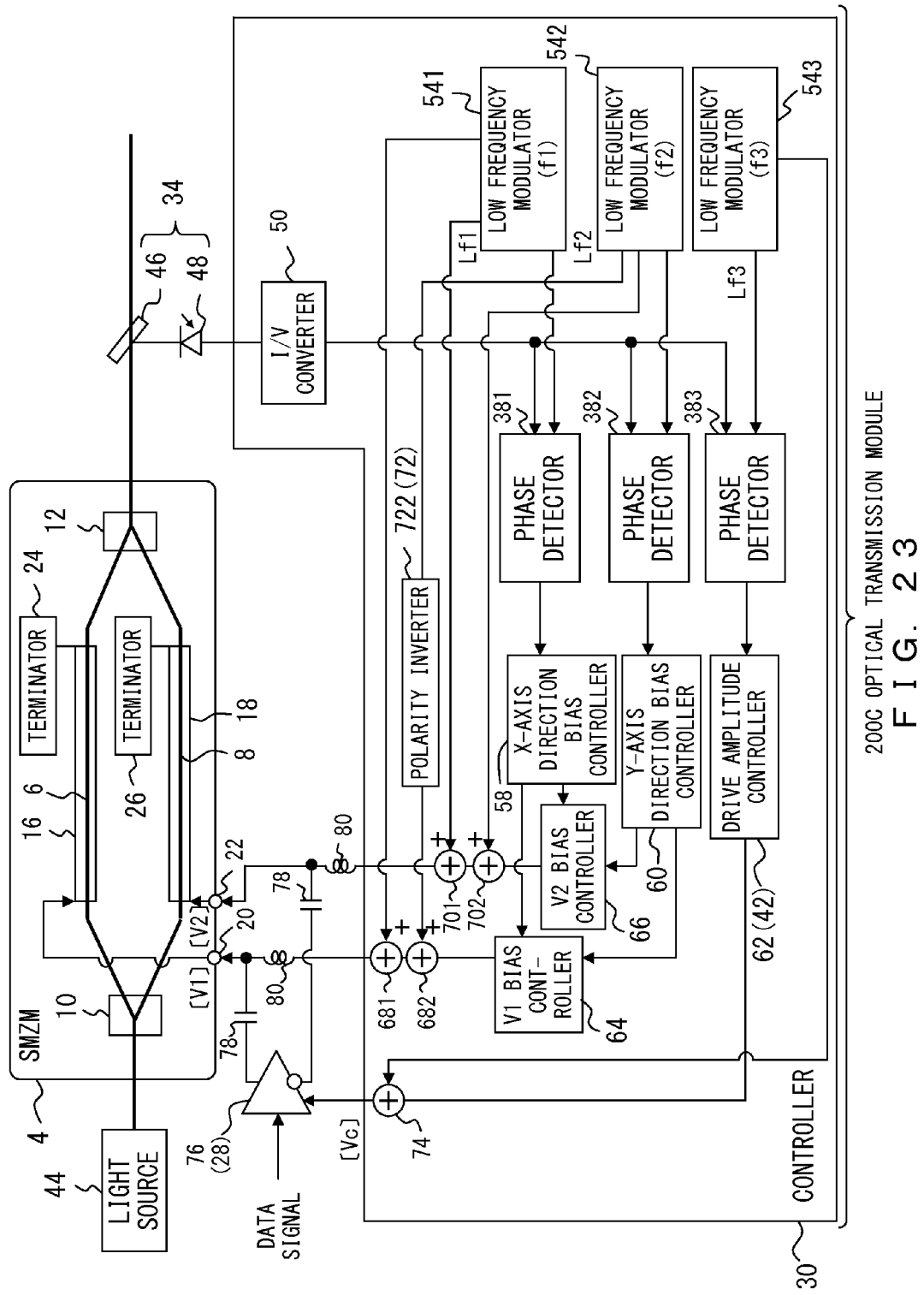
FIG. 23 illustrates an example of an optical transmission module according to the fourth embodiment.

Refer to FIG. 23 for the fourth embodiment. FIG. 23 illustrates an example of a configuration of the optical modulator according to the fourth embodiment. In FIG. 23, a element also appearing in FIG. 21 is assigned the same reference numeral.

An optical transmission module 200C illustrated in FIG. 23 is an example of the optical modulator, the optical transmitter, and the optical modulation control method according to the present application. The optical transmission module 200C includes the SMZM 4, the controller 30, the driver 28 (driver circuit 76), and the optical monitor 34 illustrated in FIG. 1. The light source 44 is provided at the input side of the SMZM 4.

In the controller 30 of the optical transmission module 200C, low frequency signals LF1, LF2, and Lf3 of different frequencies f1, f2, and f3 are used. That is, the above-mentioned bias voltage control in the Y-axis direction, the bias voltage control in the X-axis direction, and the drive amplitude control are performed using these three low frequency signals LF1, LF2, and Lf3. In the embodiment, the low frequency signal Lf1 is used for control of the bias voltage in the X-axis direction, the low frequency signal Lf2 is used for control of the bias voltage in the Y-axis direction, and the low frequency signal Lf3 is used for control of the amplitude of the modulation signal.

The controller 30 includes a first low frequency modulator 541, a second low frequency modulator 542, and a third low frequency modulator 543. The first low frequency modulator 541 generates the low frequency signal Lf1 of the frequency f1, the second low frequency modulator 542 generates the low frequency signal Lf2 of the frequency f2, and the third low frequency modulator 543 generates the low frequency signal Lf3 of the frequency f3. The frequencies f1, f2, and f3 are not specifically restricted, but may be, for example, f1=1 kHz, f2=1.3 kHz, and f3=1.6 kHz.

The low frequency signal Lf1 is superimposed on the output signal of the V1bias controller 64 by an adder 681. The low frequency signal Lf1 is also superimposed on the output signal of the V2bias controller 66 by an adder 701. The low frequency signal Lf2 is reversed by a polarity inverter 722, and then the reversed low frequency signal Lf2 is superimposed on the output signal of the V1bias controller 64 by an adder 682. Furthermore, the low frequency signal Lf2 is superimposed on the output signal of the V2bias controller 66 by an adder 702. The low frequency signal Lf3 is superimposed on the output signal of the drive amplitude controller 62 by the adder 74. Therefore, the data signal modulation signal output from the driver circuit 76 is amplitude-modulated by the low frequency signal Lf3. Then, the SMZM 4 is provided with the bias voltage and the modulation signal on which the low frequency signals LF1, LF2, and Lf3 are superimposed.

To detect each low frequency component corresponding to the low frequency signals LF1, LF2, and Lf3, the controller 30 includes phase detectors 381, 382, and 383. Each of the phase detector 381, 382, and 383 includes a phase comparator and an integrator 561.

The phase detector 381 detects the frequency component (Lf1 component) which is the same as the low frequency signal Lf1 from the output signal of the I/V converter 50 using the low frequency signal Lf1. Similarly, the phase detector 382 detects the frequency component (Lf2 component) which is the same as the low frequency signal Lf2 from the output signal of the I/V converter 50 using the low frequency signal Lf2. The phase detector 383 detects the frequency component (Lf3 component) which is the same as the low frequency signal Lf3 from the output signal of the I/V converter 50 using the low frequency signal Lf3.

The Lf1 component detected by the phase detector 381 is provided for the X-axis direction bias controller 58. The X-axis direction bias controller 58 controls the V1bias controller 64 and the V2bias controller 66 to reduce the Lf1 component. That is, the bias voltages V1bias and V2bias is controlled so that the Lf1 component is reduced. Similarly, the Lf2 component detected by the phase detector 382 is provided for the Y-axis direction bias controller 60. The Y-axis direction bias controller 60 controls the V1bias controller 64 and the V2bias controller 66 to reduce the LF2 component. That is, the bias voltages V1bias and V2bias are controlled so that the Lf2 component can be reduced. Furthermore, the Lf3 component detected by the phase detector 383 is provided for the drive amplitude controller 62. The drive amplitude controller 62 controls the amplitude control voltage Vc to reduce the Lf3 component.

According to the fourth embodiment, the bias voltage control in the Y-axis direction, the bias voltage control in the X-axis direction, and the control of the amplitude of the modulation signal are performed using the low frequency signals Lf1 through Lf3 of different frequencies. Therefore, in the fourth embodiment, the bias voltage control in the Y-axis direction, the bias voltage control in the X-axis direction, and the control of the amplitude of the modulation signal can be performed in parallel. In addition, since the low frequency signals having different frequencies are used, the detection accuracy of the optical output characteristic can be enhanced, thereby realizing high accuracy control.

Fifth Embodiment

Figure 24:
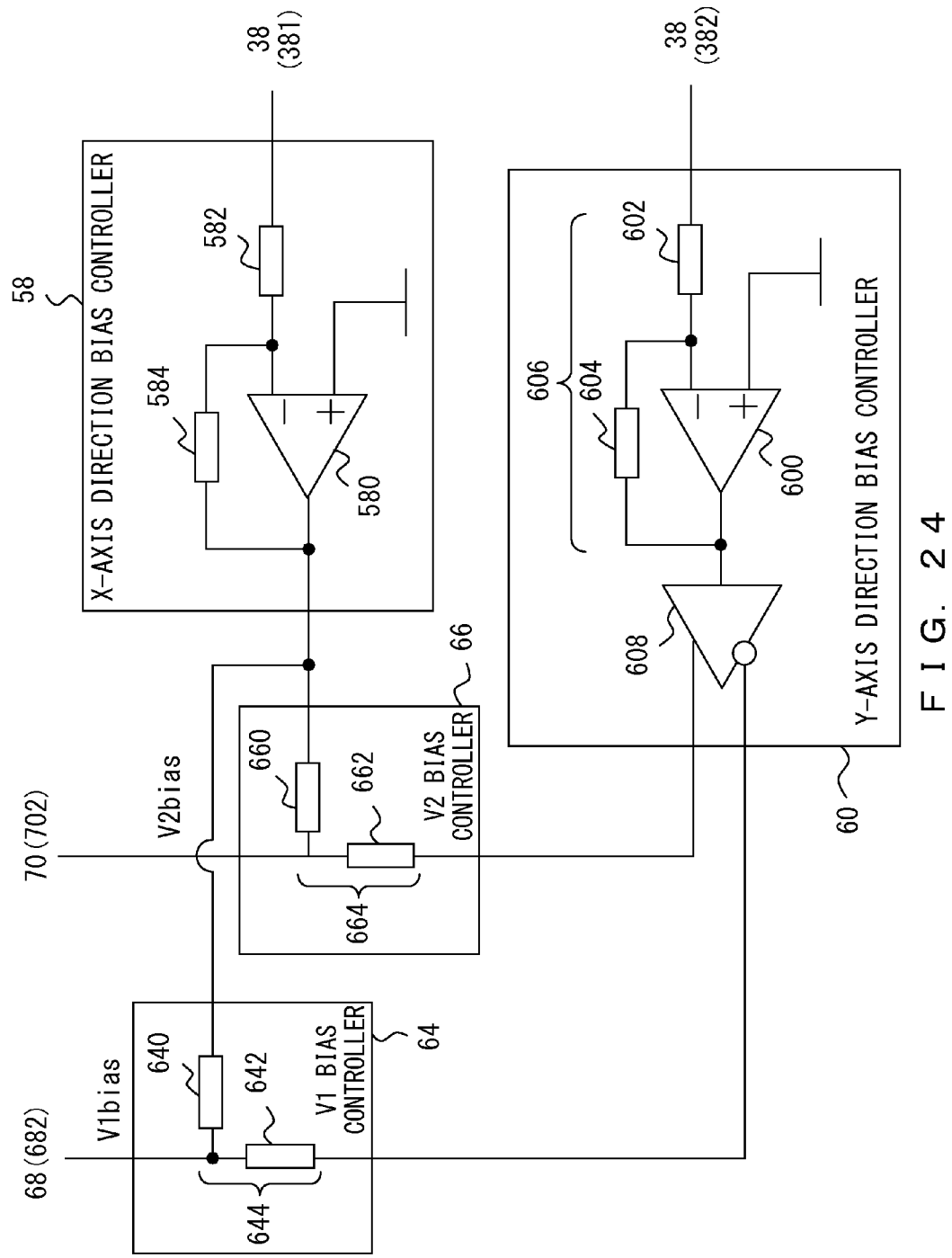
FIG. 24 illustrates an example of an X-axis direction bias controller, a Y-axis direction bias controller, and a bias controller according to the fifth embodiment.

Refer to FIG. 24 for the fifth embodiment. FIG. 24 illustrates an example of a configuration of a bias controller according to the fifth embodiment. In FIG. 24, the same element appearing in FIGS. 8, 21, and 23 is assigned the same reference numerals.

The X-axis direction bias controller 58, the Y-axis direction bias controller 60, the V1bias controller 64, and the V2bias controller 66 in FIG. 24 are used for the above-mentioned controller 30. The X-axis direction bias controller 58 is realized in this example by a reverse amplification circuit including an operation amplifier 580 and resistors 582 and 584. In this case, the X-axis direction bias controller 58 outputs a signal of the level depending on the amount of voltage change of the output signal of the integrator 56 of the phase detector 38. The Y-axis direction bias controller 60 includes in this example a reverse amplification circuit 606 and amplifier 608. The reverse amplification circuit 606 includes an operation amplifier 600 and resistors 602 and 604. The amplifier 608 obtains non-reversed output and reversed output. In this case, the Y-axis direction bias controller 60 outputs a signal at the level depending on the amount of voltage change of the output of the integrator 56 of the phase detector 38, and its reversed signal.

The V1bias controller 64 is realized by, for example, a resistor network circuit 644 including resistors 640 and 642. The V1bias controller 64 is provided with a signal output from the X-axis direction bias controller 58 and a reversed signal output from the Y-axis direction bias controller 60. The resistor network circuit 644 generates the bias voltage V1bias by combining two input signals. Similarly, the V2bias controller 66 is realized by, for example, a resistor network circuit 664 including resistors 660 and 662. In this case, the V2bias controller 66 is provided with a signal output from the X-axis direction bias controller 58, and a non-reversed signal output from the Y-axis direction bias controller 60. The resistor network circuit 664 generates the bias voltage V2bias by combining two input signals.

<Variations>

(1) In the embodiments above, a semiconductor Mach-Zehnder modulator (SMZM) is exemplified as an optical modulator, but the present invention is not limited to this configuration. That is, the optical modulator can be realized by other modulators.

(2) The present invention can be applied to any phase modulating scheme (binary phase modulation, multilevel phase modulation, polarization multiplexed multilevel phase modulation, etc.).

(3) In the embodiments above, the bias voltages in the modulation direction and the direction orthogonal to the modulation direction are controlled for phase modulation. However, the optical modulator of the invention does not have to control the bias in both directions. That is to say, the optical modulator of the invention controls the bias in at least one of the two directions.

(4) In the embodiments above, the bias control of the modulation direction, the bias control in the orthogonal direction, and the control of the drive amplitude are performed. However, the optical modulator of the invention does not have to perform all of the three operation modes. That is to say, the optical modulator of the invention may perform only one or two of the three operation modes.

(5) The optical modulator/optical transmission module may be configured control the bias only in the X-axis direction by performing an in-phase low frequency modulating on a differential bias voltage.

(6) The optical modulator/optical transmission module may be configured to control the bias only in the Y-axis direction by performing a reversed-phase low frequency modulating on a differential bias voltage.

(7) The optical modulator/optical transmission module may be configured to control only one of the X-axis direction bias and Y-axis direction bias, and control the drive amplitude.

(8) The driver circuit 76 and/or the controller 30 may be configured by a digital circuit. In this case, the digital circuit may include a computer, a PLD (programmable logic device), an FPGA (field programmable gate array) etc.

(9) In the third embodiment, time division scheme is performed using one low frequency signal Lf. In the fourth embodiment, control is performed in the frequency division scheme using the low frequency signals Lf1 through Lf3 of different frequencies. However, the present invention is not limited to these control schemes. That is, the time division scheme similar to the third embodiment may be performed while using a plurality of low frequency signals of different frequencies. In addition, when a plurality of low frequency signals are used, the levels of the low frequency signals may be different.

Comparison Example

Refer to FIG. 25 for a comparison example. FIG. 25 illustrates a SMZM and its peripheral circuits. The optical modulator of the comparison example includes the above-mentioned SMZM 4. In FIG. 25, the same elements in FIGS. 1 and 8 are assigned the same reference numerals.

A driver circuit 280 is electrically coupled to the input terminals 20 and 22 of the SMZM 4. In addition, and the bias control circuits 130 and 132 are electrically coupled to the input terminals 20 and 22, respectively. An amplitude control circuit 134 is electrically coupled to the driver circuit 280. The waveforms 136, 138, and 140 are waveforms of the input data signal, the input voltage V1, and the input voltage V2, respectively.

The output optical signal of the SMZM 4 is generated by combining the transmission light of the optical waveguides 6 and 8. Therefore, the power of the output optical signal depends on the phases of a pair of light beams passing the optical waveguides 6 and 8. That is, when the phases of a pair of light beams passing the optical waveguides 6 and 8 are the same, the power of the output optical signal is the maximum. When the phases of the pair of the light beams are opposite each other, the power of the output optical signal is the minimum.

In the SMZM 4, the refractive indexes of the optical waveguides 6 and 8 change with the respective input voltages V1 and V2, respectively. That is, the phases of the light which passes the optical waveguides 6 and 8 change with the input voltages V1 and V2, respectively. In the phase modulation, the SMZM 4 is driven by the push-pull scheme (differential scheme) to suppress the optical frequency chirp.

In the phase modulation using the SMZM 4, an optimum drive amplitude and optimum bias voltage are determined in advance for each SMZM device and for each wavelength of carrier light, and the determined operation condition is set in the optical modulator. However, there are the following problems with the configuration in which the setting is made.

As described above, with the configuration in which the operation condition is set for each SMZM device and for each wavelength of the carrier light, it takes long time to determine the optimum operation condition.

In addition, the optimum operation condition of the SMZM may fluctuate by various factors. For example, the static characteristic of the SMZM can be changed by a temperature change or aging of a device etc. In addition, when the characteristics of the bias control circuits 130 and 132, the driver circuit 280, and the amplitude control circuit 134 are changed, the drive amplitude and the bias voltage may fluctuate. If the drive amplitude or the bias voltage is shifted from the optimum point by these factors, there occur the fold-back of an optical waveform, the degradation of extinction ratio, the fluctuation of cross point, and the reduction of the aperture of an optical waveform, thereby degrading the quality of the optical waveform. These problems have been solved by the configuration and the control method according to the embodiments of the present application.

In the LN ($LiNbO_3$) optical modulator, the bias control and the drive amplitude control are performed in the Y-axis direction, but no control is performed in the X-axis direction. However, the static characteristic of the SMZM has the X axis dependency. Therefore, if the control performed for the LN optical modulator is introduced to the SMZM, it is difficult or impossible to obtain the optimum operation condition of the SMZM.

<QPSK Modulation>

FIG. 26 illustrates a configuration of an optical transmission module provided with a QPSK modulator. An optical transmission module 300 includes a QPSK modulator 301. The QPSK modulator 301 includes an SMZM 4a, an SMZM 4b, and a phase shifter 302. The configurations of the SMZM 4a and the SMZM 4b are substantially the same as that of the SMZM 4 illustrated in FIG. 1. However, input signals V1 and V2 are applied to the SMZM 4a, and input signals V3 and V4 are applied to the SMZM 4b. The QPSK modulator 301 is formed on, for example, one semiconductor chip. However, the terminators 24 and 26 illustrated in FIG. 27 may be provided outside the semiconductor chip. In this case, the semiconductor chip and the terminators 24 and 26 are coupled by a bonding wire.

The phase shifter 302 provides a phase difference $\pi/2$ between the optical path which passes through the SMZM 4a and the optical path which passes through the SMZM 4b. The QPSK modulator 301 combines the phase modulated optical signals generated by the SMZMs 4a and 4b to generate a QPSK modulated optical signal.

The optical splitter 46 branches the QPSK modulated optical signal. The photo detector 48 converts the QPSK modulated optical signal guided from the optical splitter 46 into a current signal. The I/V converter 50 converts the current signal generated by the photo detector 48 into a voltage signal. That is, the I/V converter 50 generates an electric signal indicating the QPSK modulated optical signal.

The phase controller 303 uses the output of the I/V converter 50 (that is, uses the QPSK modulated optical signal generated by the QPSK modulator 301), and optimizes the amount of phase shift of the phase shifter 302 to $\pi/2$. The method of adjusting the phase shifter 302 is not specifically limited, but can be performed by the method described in Japanese Laid-open Patent Publication No. 2007-82094.

The low frequency modulator 54 generates a low frequency signal Lf. In addition, the phase comparator 52 and the integrator 56 uses the low frequency signal Lf to detect the low frequency component in the QPSK modulated optical signal.

An amplitude/bias controller 304a controls the bias voltage of the SMZM 4a and the amplitude of the modulation signal of the modulation signal to drive the SMZM 4a based on the low frequency component in the QPSK modulated optical signal. Likewise, an amplitude/bias controller 304b controls the bias voltage of the SMZM 4b and the amplitude of the modulation signal to drive the SMZM 4b based on the low frequency component in the QPSK modulated optical signal. A time division controller 305 controls the operations of the amplitude/bias controllers 304a and 304b.

Figure 27:
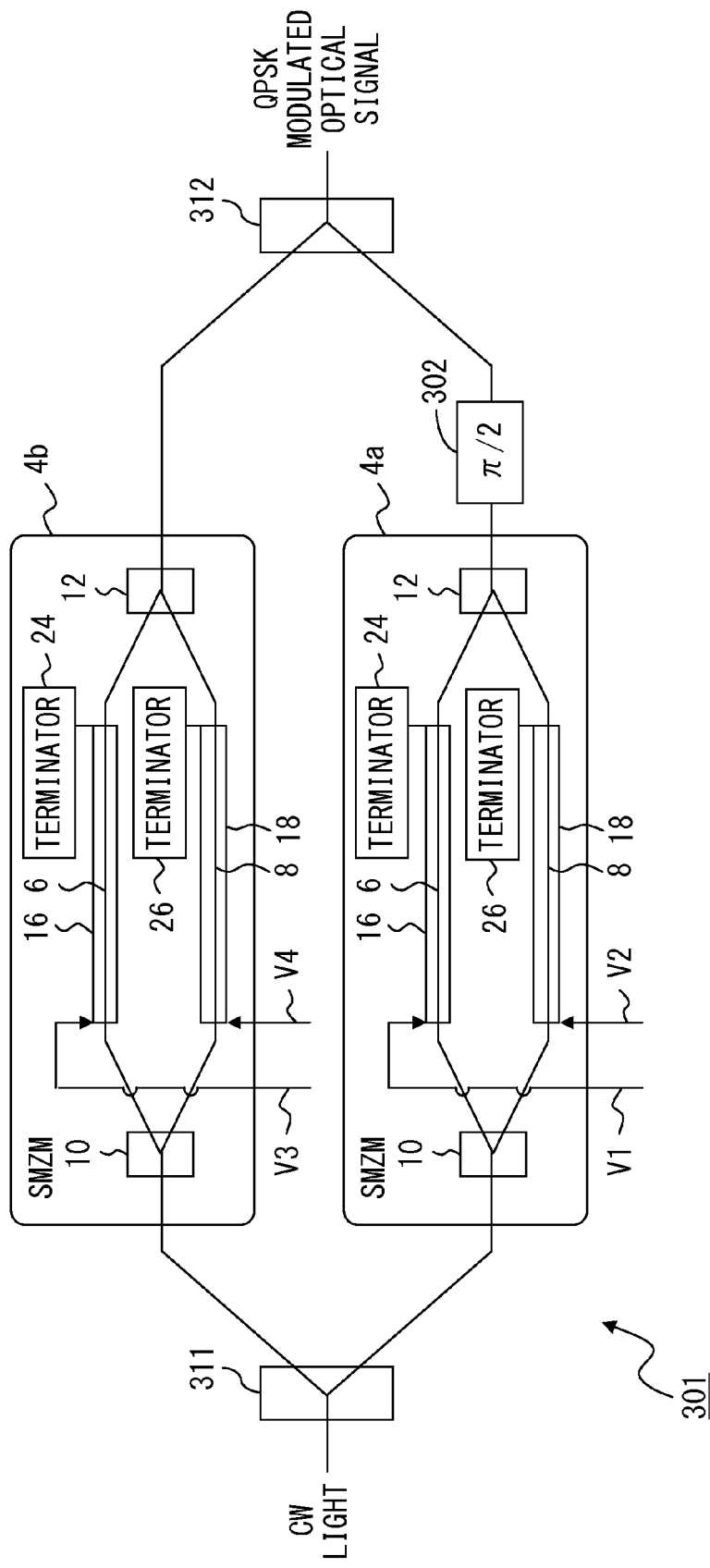
FIG. 27 illustrates a configuration of the QPSK modulator illustrated in FIG. 26.

FIG. 27 illustrates a configuration of the QPSK modulator 301 illustrated in FIG. 26. The QPSK modulator 301 includes the SMZMs 4a and 4b, the phase shifter 302, an optical splitter 311, and an optical combiner 312.

The optical splitter 311 branches the input CW light and guides the CW light to the SMZMs 4a and 4b. Each of the SMZMs 4a and 4b are substantially the same as the SMZM 4 illustrated in FIG. 1 etc. However, the signal electrodes 16 and 18 of the SMZM 4a are provided with the input voltages V1 and V2, respectively. The input voltage V1 is generated by adding the bias voltage V1bias output from the amplitude/bias controller 304a to the modulation signal output from the driver circuit 76a. The input voltage V2 is generated by adding the bias voltage V2bias output from the amplitude/bias controller 304a to the reversed modulation signal output from the driver circuit 76a. Similarly, the input voltages V3 and V4 are respectively applied to the signal electrodes 16 and 18 of the SMZM 4b. The input voltage V3 is generated by adding the bias voltage V3bias output from the amplitude/bias controller 304b to the modulation signal output from the driver circuit 76b. The input voltage V4 is generated by adding the bias voltage V4bias output from the amplitude/bias controller 304b to the reversed modulation signal output from the driver circuit 76b. The optical combiner 312 combines the optical signals generated by the SMZMs 4a and 4b. With the configuration, the QPSK modulated optical signal is generated.

Figure 28A:
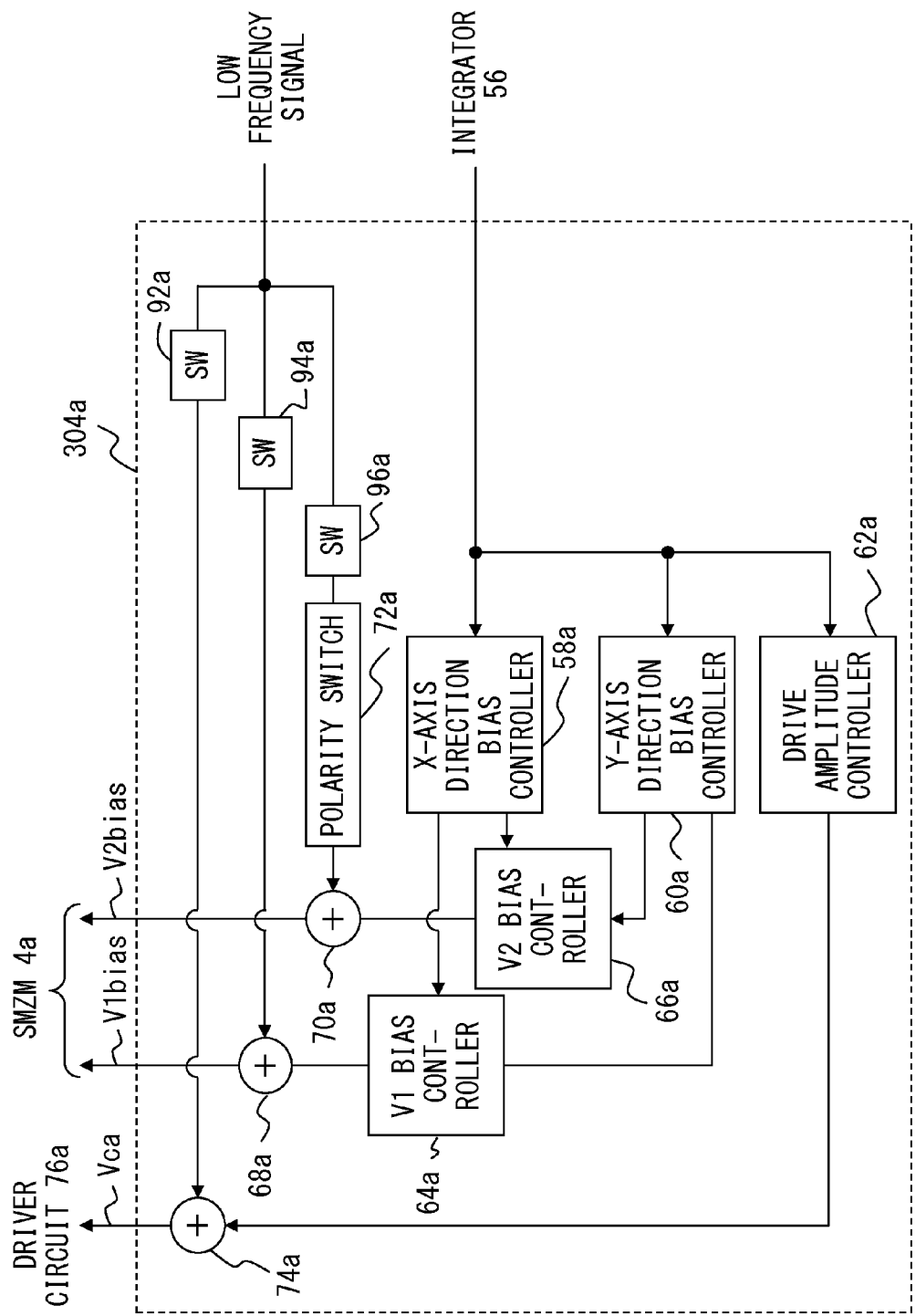
FIGS. 28A and 28B illustrate a control system of the optical transmission module in FIG. 26.
Figure 28B:
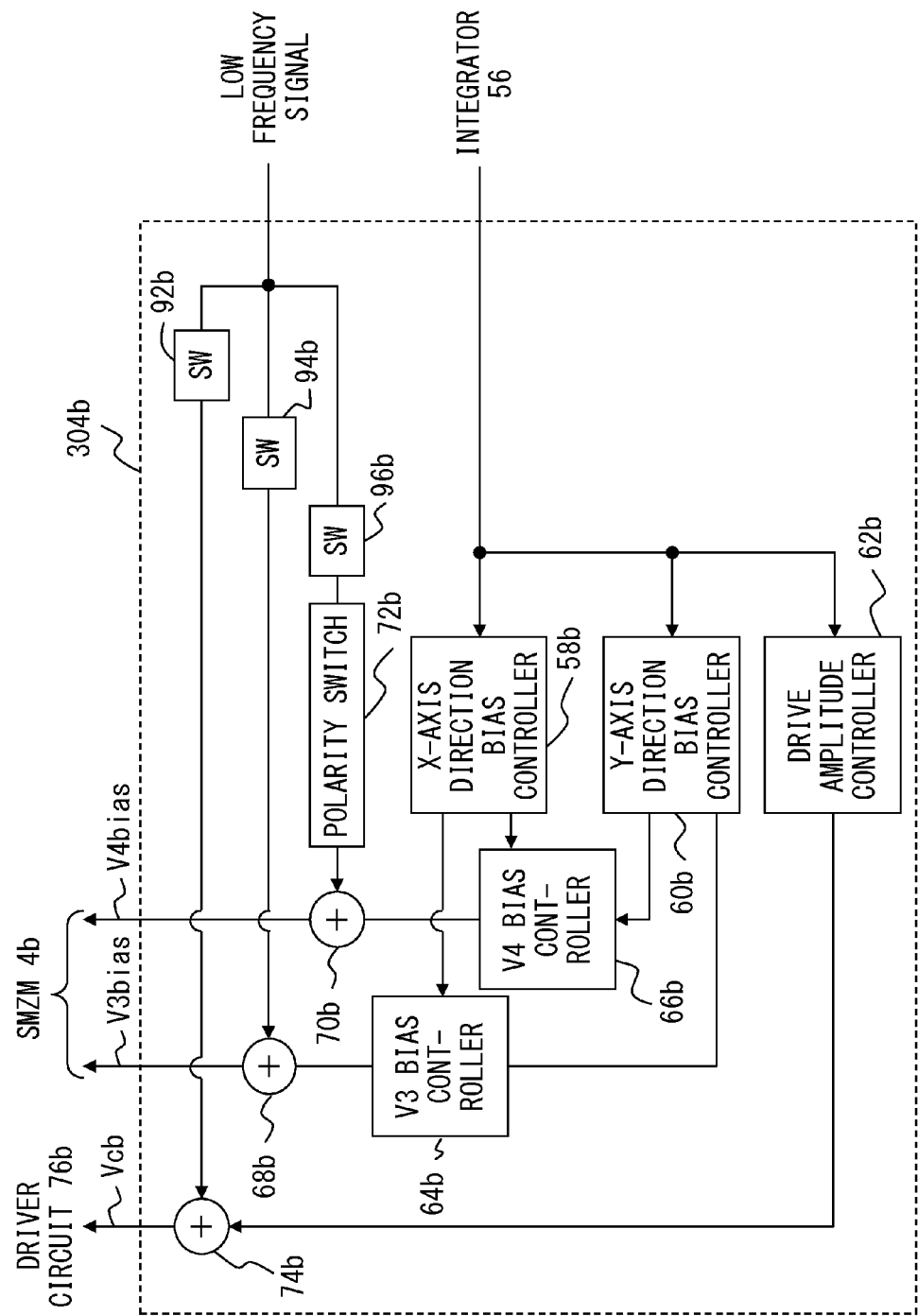

FIGS. 28A and 28B illustrate a control system of the optical transmission module 300 illustrated in FIG. 26. In FIGS. 28A and 28B, only the amplitude/bias controllers 304a and 304b are illustrated as a control system of the optical transmission module 300.

The amplitude/bias controller 304a includes the X-axis direction bias controller 58a, the Y-axis direction bias controller 60a, the drive amplitude controller 62a, the V1bias controller 64a, the V2bias controller 66a, the adders 68a, 70a, and 74a, the polarity switch 72a, and the low frequency switches 92a, 94a, and 96a. Similarly, the amplitude/bias controller 304b includes the X-axis direction bias controller 58b, the Y-axis direction bias controller 60b, the drive amplitude controller 62b, the V3bias controller 64b, the V4bias controller 66b, the adders 68b, 70b, and 74b, the polarity switch 72b, and the low frequency switches 92b, 94b, and 96b. The operations of the amplitude/bias controllers 304a and 304b are substantially the same as those of the X-axis direction bias controller 58, the Y-axis direction bias controller 60, the drive amplitude controller 62, the V1bias controller 64, the V2bias controller 66, the adders 68, 70, and 74, the polarity switch 72, the low frequency switches 92, 94, and 96. However, the amplitude/bias controller 304a generates the bias voltages V1bias and V2bias and the amplitude control voltage Vca. The amplitude/bias controller 304b generates the bias voltages V3bias and V4bias and the amplitude control voltage Vcb.

Figure 29:
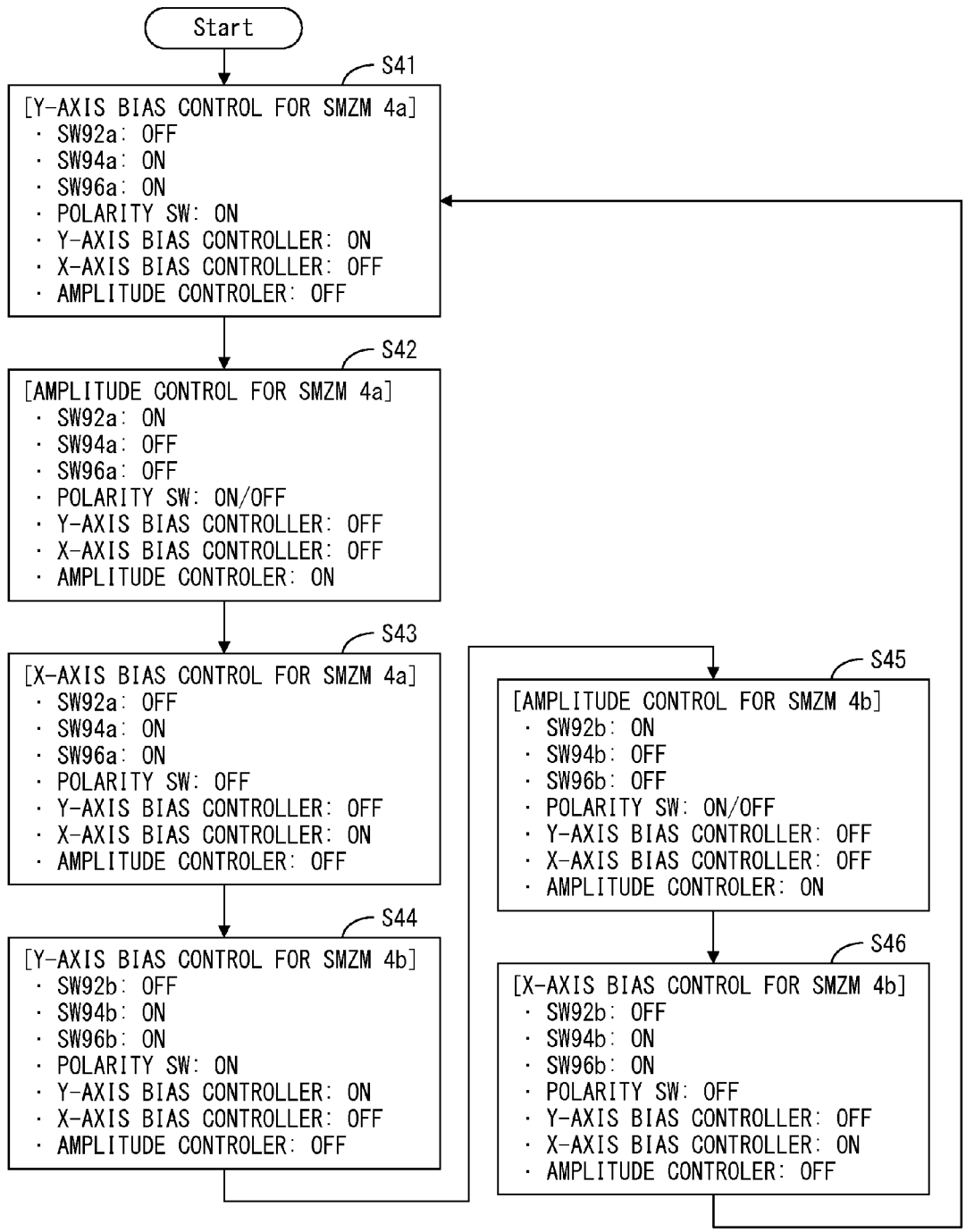
FIG. 29 is a flowchart of the method of controlling the optical transmission module in FIG. 26.

FIG. 29 is a flowchart of the control method of the optical transmission module 300 illustrated in FIG. 26. The process of the flowchart is realized by the time division controller 305 issuing an instruction to the amplitude/bias controllers 304a and 304b.

The processes in S41-S43, and the processes in S44-S46 are substantially the same as those in S31-S33 in FIG. 22. However, the processes in S41-S43 are performed on the amplitude/bias controller 304a to control the operating state of the SMZM 4a. The processes in S44-S46 are performed on the amplitude/bias controller 304b to control the operating state of the SMZM 4b.

In the embodiment illustrated in FIG. 29, the bias voltage of the QPSK modulator 301 and the amplitude of the modulation signal are controlled in time division scheme, but the present invention is not limited to this scheme. That is, the bias voltage of the QPSK modulator 301 and the amplitude of the modulation signal may be controlled in parallel by, for example, a frequency division scheme.

The embodiments of the optical modulator, the optical transmitter, and the optical modulation control method are described above, but the present invention is not limited to the descriptions above, and those skilled in the art can modify and vary in various ways based on the gist of the present invention described in the scope of the claims for the patent and disclosed in the embodiments. The modifications and variations are included in the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has(have) been described in detail, it should be understood that the various changes, substitutions, and alterations could be made hereto without departing from the spirit and scope of the invention.

What is claimed is:

1. An optical modulator comprising:
   a QPSK modulator including first and second modulators, each of the first and second modulators including an optical waveguide provided in a semiconductor substrate having an electro-optical effect and an electrode to apply an electric field depending on a bias voltage and a modulation signal to the optical waveguide;
   a first driver circuit configured to generate a first modulation signal for driving the first modulator in accordance with a first input signal;
   a second driver circuit configured to generate a second modulation signal for driving the second modulator in accordance with a second input signal;
   a first superimposer configured to superimpose a reference signal on a bias voltage of the first modulator, the reference signal having lower frequency than the first modulation signal and the second modulation signal;
   a second superimposer configured to superimpose the reference signal on a bias voltage of the second modulator;
   a first controller configured to control a bias voltage in a modulation direction of the first modulator and a bias voltage in an orthogonal direction orthogonal to the modulation direction of the first modulator based on a frequency component of the reference signal extracted from a QPSK modulated optical signal generated by the QPSK modulator; and
   a second controller configured to control a bias voltage in a modulation direction of the second modulator and a bias voltage in an orthogonal direction orthogonal to the modulation direction of the second modulator based on a frequency component of the reference signal extracted from the QPSK modulated optical signal, wherein in each of the first and second modulators, the optical waveguide includes first and second optical waveguides forming a Mach-Zehnder interferometer, in each of the first and second modulators, the electrode includes first and second electrodes respectively to apply an electric field to the first and second optical waveguides, in each of the first and second modulators, the modulation signal and a first bias voltage are provided for the first electrode, in each of the first and second modulators, a reversed signal of the modulation signal and a second bias voltage are provided for the second electrode, each of the first and second modulators provided in the semiconductor substrate has a configuration in which an intensity of output light changes by shifting the first bias voltage and the second bias voltage in the same direction, the first controller controls the bias voltage in the orthogonal direction of the first modulator by shifting the first bias voltage and the second bias voltage of the first modulator in the same direction based on the frequency component of the reference signal extracted from the QPSK modulated optical signal generated by the QPSK modulator, the second controller controls the bias voltage in the orthogonal direction of the second modulator by shifting the first bias voltage and the second bias voltage of the second modulator in the same direction based on the frequency component of the reference signal extracted from the QPSK modulated optical signal generated by the QPSK modulator.

2. An optical modulator comprising:

a QPSK modulator including first and second modulators, each of the first and second modulators including an optical waveguide provided in a semiconductor substrate having an electro-optical effect and an electrode to apply an electric field depending on a bias voltage and a modulation signal to the optical waveguide;

a first driver circuit configured to generate a first modulation signal for driving the first modulator in accordance with a first input signal;

a second driver circuit configured to generate a second modulation signal for driving the second modulator in accordance with a second input signal;

a first superimposer configured to superimpose a reference signal on a bias voltage of the first modulator, the reference signal having lower frequency than the first modulation signal and the second modulation signal;

a second superimposer configured to superimpose the reference signal on a bias voltage of the second modulator;

a first controller configured to control a bias voltage of the first modulator based on a frequency component of the reference signal extracted from a QPSK modulated optical signal generated by the QPSK modulator; and a second controller configured to control a bias voltage of the second modulator based on a frequency component of the reference signal extracted from the QPSK modulated optical signal, wherein in each of the first and second modulators, the optical waveguide includes first and second optical waveguides forming a Mach-Zehnder interferometer, in each of the first and second modulators, the electrode includes first and second electrodes respectively to apply an electric field to the first and second optical waveguides, in each of the first and second modulators, the modulation signal and a first bias voltage are provided for the first electrode, in each of the first and second modulators, a reversed signal of the modulation signal and a second bias voltage are provided for the second electrode, each of the first and second modulators provided in the semiconductor substrate has a configuration in which an intensity of output light changes by shifting the first bias voltage and the second bias voltage in the same direction, the first controller controls the intensity of output light of the first modulator by shifting the first bias voltage and the second bias voltage of the first modulator in the same direction based on the frequency component of the reference signal extracted from the QPSK modulated optical signal generated by the QPSK modulator, the second controller controls the intensity of output light of the second modulator by shifting the first bias voltage and the second bias voltage of the second modulator in the same direction based on the frequency component of the reference signal extracted from the QPSK modulated optical signal generated by the QPSK modulator.

* * * * *